(12) United States Patent
Pragier et al.

(10) Patent No.: US 12,488,503 B1
(45) Date of Patent: Dec. 2, 2025

(54) SYSTEMS AND METHODS FOR CAMERA LOCALIZATION WITH PLANAR SURFACES

(71) Applicant: Amazon Technologies, Inc., Seattle, WA (US)

(72) Inventors: Gabriel Pragier, Herzliya (IL); Matan Karklinsky, Zur Hadassa (IL); Eli Alshan, Kfar-Saba (IL); Lior Fritz, Tel Aviv (IL); Avi Avraham Ben-Cohen, Holon (IL); Ianir Ideses, Raanana (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/967,413

(22) Filed: Dec. 3, 2024

(51) Int. Cl.
G06T 7/80 (2017.01)
G06T 7/162 (2017.01)
G06T 7/174 (2017.01)

(52) U.S. Cl.
CPC ............. G06T 7/85 (2017.01); G06T 7/162 (2017.01); G06T 7/174 (2017.01); *G06T 2207/10012* (2013.01); *G06T 2207/20048* (2013.01)

(58) Field of Classification Search
CPC .................................. G06T 7/85; G06T 7/162
See application file for complete search history.

(56) References Cited

U.S. PATENT DOCUMENTS

| | | | | |
|---|---|---|---|---|
| 5,598,515 | A * | 1/1997 | Shashua | G06T 15/10 345/422 |
| 8,238,610 | B2 * | 8/2012 | Shah | G06T 7/73 382/104 |
| 8,326,036 | B2 * | 12/2012 | Heitz | G06T 7/593 382/173 |
| 9,652,849 | B2 * | 5/2017 | Li | G06T 1/20 |
| 9,704,232 | B2 * | 7/2017 | Karam | G06T 7/593 |
| 10,460,512 | B2 * | 10/2019 | Chen | G06V 10/40 |
| 11,651,508 | B1 * | 5/2023 | Zhou | G06V 20/56 382/104 |
| 11,729,367 | B2 * | 8/2023 | Park | H04N 23/698 348/38 |
| 12,015,755 | B2 * | 6/2024 | Kim | H04N 13/111 |
| 12,260,575 | B2 * | 3/2025 | Busam | G06T 7/60 |
| 2014/0010407 | A1 * | 1/2014 | Sinha | G06T 7/73 382/103 |
| 2016/0180535 | A1 * | 6/2016 | Zalmanson | G06T 7/337 382/103 |

(Continued)

*Primary Examiner* — Irfan Habib

(74) *Attorney, Agent, or Firm* — K&L Gates LLP

(57) ABSTRACT

Systems and techniques are described for localizing a camera. An example method includes generating first image data comprising a first image plane representing the planar scene from a first point-of-view. The example includes generating second image data comprising the second image plane representing the planar scene from a second point-of-view. The example includes identifying a plurality of keypoints of the planar scene that is visible in the first image plane and the second image plane. The example includes matching the plurality of keypoints of a planar scene to a first pixel of a first image plane and a second pixel of a second image plane. The example includes generating a homography relating the planar scene, the first image plane, and the second image plane. The example includes generating, based on the homography, at least one of a calibration parameter or a localization parameter for an unlocalized camera.

20 Claims, 7 Drawing Sheets

(56) References Cited

U.S. PATENT DOCUMENTS

| | | | |
|---|---|---|---|
| 2016/0335519 A1* | 11/2016 | Wagner | G06T 7/20 |
| 2018/0278916 A1* | 9/2018 | Kim | G03B 37/04 |
| 2019/0325644 A1* | 10/2019 | Bleyer | G06T 17/20 |
| 2020/0068185 A1* | 2/2020 | Tzabari | H04N 13/296 |
| 2021/0082086 A1* | 3/2021 | Bichu | G06T 5/80 |
| 2021/0192257 A1* | 6/2021 | Adusumalli | G06V 20/59 |
| 2021/0304422 A1* | 9/2021 | Yu | G06T 5/77 |
| 2021/0326601 A1* | 10/2021 | Tang | G06T 7/74 |
| 2021/0334569 A1* | 10/2021 | Fang | G06V 40/171 |
| 2023/0071384 A1* | 3/2023 | Agarwal | B25J 19/023 |
| 2023/0316563 A1* | 10/2023 | Greenspan | G06T 7/50 |
| | | | 382/103 |
| 2024/0257326 A1* | 8/2024 | Kondo | G06T 3/60 |
| 2024/0271959 A1* | 8/2024 | Tang | G01C 21/20 |
| 2024/0303859 A1* | 9/2024 | Nakamura | G06T 7/251 |
| 2025/0252593 A1* | 8/2025 | Baldwin | H04N 5/74 |

\* cited by examiner

SYSTEMS AND METHODS FOR CAMERA LOCALIZATION WITH PLANAR SURFACES

BACKGROUND

Checkerboard patterns are physical signs that are used for camera calibration prior to shooting photos or filming. Such camera calibration techniques involve taking photos or video of a checkerboard pattern in an environment to determine the focal length of the camera and to correct for lens distortions. Checkerboard patterns can provide reference points to determine a position and orientation for a camera in an environment using camera localization techniques.

DETAILED DESCRIPTION

Figure 1:
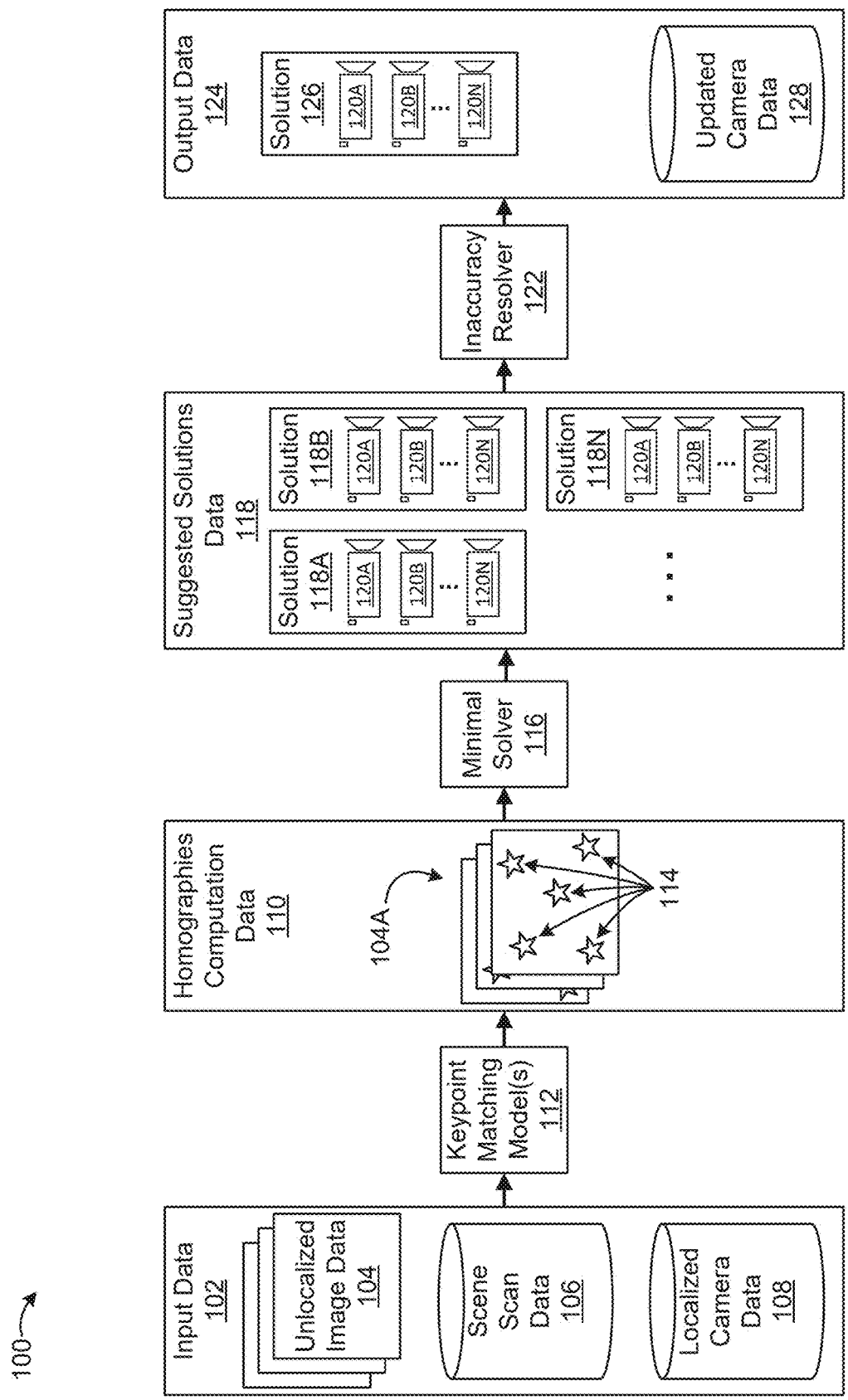
FIG. 1 illustrates example systems for camera localization, in accordance with various aspects of the present disclosure.

In the following description, reference is made to the accompanying drawings which illustrate several examples for the present disclosure. It is understood that other embodiments may be utilized, and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Multi-camera systems have become the preferred method for recording and streaming sporting events (e.g., basketball, soccer, football, etc.) for many years due to their ability to capture the action from multiple locations and angles around a sports venue. In addition, multi-camera systems can facilitate faster transitions between cameras to quickly follow the action during a game, such as a basketball as it is passed between players around the court. Many users (e.g., viewers, announcers, producers, directors, etc.) have come to enjoy and expect the flexibility and more dynamic video that multi-camera systems can add to the viewing experience for sporting events. Additionally, or alternatively, the entertainment industry uses multi-camera systems extensively for video (e.g., movies, television shows, music videos, etc.) production because they can enable users (e.g., producers, directors, artists, etc.) to capture scenes from various angles simultaneously, providing for richer and more immersive visual narratives and greater post-production editing flexibility. Additionally, retailers can use multi-camera security systems to monitor different areas of their stores (e.g., checkout areas, aisles, entrances, exits, etc.) and/or storage facilities (e.g., warehouses, inventory rooms, etc.). Multi-camera security systems can help to deter theft (e.g., in traditional stores, cashier less stores, storage facilities, etc.) and ensure the safety of both customers and employees.

Setting up multi-camera systems prior to use at a location (e.g., sports venue, store, warehouse, outdoors, etc.) can be burdensome, because a non-trivial amount of time is required to calibrate and localize each camera in a multi-camera system relative to its particular location. Many sports venues (e.g., stadiums, arenas, etc.) may not utilize permanent multi-camera systems for recording sporting events and/or other forms of live entertainment. Accordingly, users (e.g., crewmembers, producers, directors, etc.) often have to setup their multi-camera systems prior to each event, and setup may have to be performed in the short time between events. For example, an ice-skating show may breakdown their sets and leave an arena the night before a sporting event, leaving the sporting event crew only a few hours to place, calibrate, and localize each of their cameras prior to the sporting event. Additionally, or alternatively, a retail store may be forced to install multi-camera security systems outside of standard business hours to avoid interruptions when the store is open.

Traditionally, setting up (e.g., calibrating and localizing) multi-camera systems and/or incorporating new cameras into existing multi-camera systems has been labor intensive, and automated techniques have been limited. For example, some conventional camera calibration and localization techniques involve placing a checkerboard pattern within the field-of-view of each camera of the multi-camera system to provide a standard point of reference. By capturing multiple images of the checkerboard pattern from different angles and/or depths, a camera operator can determine a focal length (or zoom factor), optical center, and/or lens distortion for each camera which is necessary for camera calibration. In addition, the camera operator can localize each camera by determining a position and/or an orientation for each camera relative to the checkerboard pattern. However, these traditional methods require a controlled environment, careful setup, and a series of photos from each camera, which can be time-consuming and impractical for dynamic environments, such as outdoor venues with shifting lighting conditions and temperature ranges. Additionally, any movement or adjustment of the cameras can require re-calibration and re-localization further limiting flexibility and adding to setup time. In some environments, such as stores (e.g., cashierless stores, etc.) using checkerboard calibration patterns near customers can be disruptive for business and may cause an undesirable shopping experience. Additionally, or alternatively, using checkerboard calibration patterns when staging a theater or sports venue (e.g., arena, etc.) for an event can be disruptive for other workers performing essential event preparations (e.g., assembling a stage, waxing a basketball court, freezing and/or shaving an ice rink, etc.) which can create undesirable scheduling delays.

In contrast to the traditional systems and techniques described above, improved systems and techniques for setting up multi-camera systems are described herein. The present disclosure sets forth systems, methods, and apparatuses that, among other things, provide improved methods for localizing cameras in planar scenes (e.g., comprising one or more planar surfaces, such as a basketball court, floor, wall, counter, shelf, etc.). There are many advantages of these, and other examples described herein over traditional systems, such as those traditional systems described above.

One advantage is that systems and techniques described herein present a camera localization approach for planar scenes that eliminates the need for initial camera calibration (e.g., prior to and separate from the camera localization process). For example, unlike conventional systems and techniques, the present disclosure provides examples that do not require a preliminary calibration step to determine one or more of a focal length (or zoom factor), optical center, and/or lens distortion for each camera. It should be appreciated that such examples can eliminate the need for traditional calibration patterns, such as checkerboards. Accordingly, these examples eliminate the tedious and labor-intensive setup of placing one or more traditional calibration patterns in a field-of-view of each camera and capturing multiple photos from each camera (e.g., under various weather, temperature, and/or lighting conditions, such as at different times of day).

Additionally, examples described herein can reduce the time needed to complete the localization process (e.g., for each camera and/or the multi-camera system as a whole) and/or can reduce the number of users (e.g., camera technicians, camera operators, stagehands, key grips, etc.) during camera system installation and/or maintenance. For example, a checkerboard pattern does not need to be located and/or relocated manually by a user while another user captures images data from a plurality of camera locations. It should be appreciated that examples systems and techniques of the present disclosure can scan a wide range of practical applications and/or industries, such as sports broadcasting, security (e.g., for cashierless stores, self-checkout stations, etc.), movies, television shows, and/or any other locations where accurate localization of (e.g., overhead, ceiling-mounted, rig mounted, etc.) cameras is crucial for efficient and effective operation. For example, when adding one or more additional (and/or temporary) cameras to an existing (or preinstalled) multi-camera system (e.g., retail store security system, persistent or fixed camera rigs at a venue, etc.), example systems and techniques can facilitate seamless integration of the one or more additional cameras without the need for specialized setup or calibration procedures.

Moreover, it should be appreciated that such examples as set forth herein solve particular technical problems, such as those identified and described above for traditional camera calibration and/or localization systems and techniques. It will be appreciated that the scope of the present disclosure encompasses many potential example embodiments in addition to those described above, some of which will be described in further detail below.

Now that some advantages associated with various systems and processes described herein have been described above in contrast with traditional systems and techniques, example systems for camera localization will now be described below with reference to FIG. 1.

FIG. 1 illustrates example systems for camera localization, in accordance with various aspects of the present disclosure. As shown, the system 100 may comprise input data 102, one or more keypoint matching model(s) 112, homographies computation data 110, a minimal solver 116, suggested solutions data 118, an inaccuracy resolver 122, and/or output data 124. The system 100 may comprise one or more electronic devices (e.g., electronic device 600 as described below in connection with FIG. 6) configured to facilitate a camera localization pipeline, as shown in FIG. 1, for determining one or more camera parameters (described below) for one or more cameras.

For example, one or more electronic devices may execute (e.g., using processor(s) 602) one or more of the keypoint matching model(s) 112, the minimal solver 116, and/or inaccuracy resolver 122. Additionally, or alternatively, the one or more electronic devices may store (e.g., using memory 604) one or more of the input data 102, the homographies computation data 110, the suggested solutions data 118 and/or the output data 124. In some examples, the one or more electronic devices may be communicatively coupled through one or more communications networks (e.g., using network interface(s) 606) in order to exchange data with each other and/or any other electronic devices described herein, such as servers, laptops, mobile devices, cameras, and/or the like.

In some examples, the one or more camera parameters may comprise one or more of an intrinsic camera parameter and/or an extrinsic camera parameter. Example intrinsic camera parameters may comprise one or more of a focal length, a zoom factor, a principal point, a lens distortion coefficient, a skew coefficient, a scale factor, and/or any other internal characteristics of a camera that affect image data. Example extrinsic camera parameters may comprise one or more of a pan angle, a tilt angle, a roll angle, a translation vector (e.g., a distance (or magnitude) and direction relative to one or more keypoints), location coordinates, and/or any other external characteristics that describe the position and/or orientation of a camera in relation to an environment.

The input data 102, as shown, may be any image data and/or camera data as described herein for generating one or more homographies and/or determining one or more camera parameters. As shown, the input data 102 may comprise unlocalized image data 104, scene scan data 106, and/or localized camera data 108. In some examples, the input data 102 may comprise one or more templates of a planar scene. In some such examples the one or more templates may comprise template data (e.g., 3D model(s), 2D images, 2D model(s), computer-aided drawings, virtually rendered images, maps, etc.) representative of a location that may be used in place of localized image data (such as described herein) for localizing an unlocalized camera and/or calibrating an uncalibrated camera.

The unlocalized image data 104, as shown, may be any image data representative of still images (or pictures) and/or video. In addition, the unlocalized image data 104 may be image data generated by an unlocalized camera (e.g., electronic device 600, camera 120A or the like). In some examples, image data (e.g., unlocalized image data 104, etc.) may comprise one or more still images (e.g., pictures, photographs, computer-aided drawings, 2D renderings of a scene, etc.) and/or one or more videos (e.g., motion pictures, recordings, etc.). For example, an unlocalized camera may transmit (or provide via an intermediate storage device, such as a server, Network Attached Storage (NAS), etc.) the unlocalized image data 104 to the system 100 for the system 100 to determine one or more camera parameters for the unlocalized camera. In some such examples, the system 100 may utilize the one or more camera parameters to calibrate and/or localize the unlocalized camera using one or more processes (e.g., process 700) as described herein. As shown, the unlocalized image data 104 may comprise one or more images (or image frames) comprising a planar scene, a planar surface, an image plane, and/or the like as described herein. In some examples, the unlocalized camera may be any camera (as described herein) comprising unknown camera parameters (e.g., position, orientation, focal length, etc.). Additionally, or alternatively, the unlocalized camera may be a camera (e.g., camera 120A or the like) of a multi-camera system (e.g., comprising any or all of the cameras 120A-120N). In some examples, the multi-camera system may be deployed at a sports venue, a retail location, and/or any other locations as described herein. In some examples, the unlocalized image data 104 may comprise one or more images (e.g., image frames, still pictures, video, etc.) from any or all cameras of a multi-camera system to be localized relative to each other, a keypoint (or reference point), and/or a location (or an environment).

The scene scan data 106, as shown, may be any image data representative of still images (or pictures) and/or video. In some examples, image data (e.g., scene scan data 106, etc.) may comprise one or more still images (e.g., pictures, photographs, computer-aided drawings, 2D renderings of a scene, etc.) and/or one or more videos (e.g., motion pictures, recordings, etc.). Additionally, or alternatively, the scene scan data 106, as shown, may be any camera parameter data representative of one or more of a zoom factor (or focal length), position, orientation, and/or any other camera parameters for a calibrated and/or localized mobile camera (e.g., electronic device 600, camera 120B, or the like). For example, a mobile camera may capture image data (e.g., image frames, still pictures, video, etc.) representative of a planar scene (or the like) from various points-of-view around a location and record camera parameter data associated with each point-of-view (and/or each image frame of the image data). In addition, the mobile camera may transmit (or provide via an intermediate storage device) the scene scan data 106 (e.g., comprising the image data and/or the camera parameter data) to the system 100 to determine one or more camera parameters for an unlocalized camera and/or perform one or more processes (e.g., process 700) as described herein. In some such examples, the system 100 may use the scene scan data 106 (e.g., the combination of the image data and the camera parameters) from the mobile camera to localize one or more unlocalized cameras and/or to generate one or more homographics (e.g., homography 500 as described below in connection with FIG. 5). In some examples, the mobile camera may be one or more of smart phone camera, a laptop webcam, a handheld camera, a camera and tripod, and/or any other moveable electronic device and/or camera as described herein.

The localized camera data 108, as shown, may be any image data representative of still images (or pictures) and/or video. In some examples, image data (e.g., localized camera data 108, etc.) may comprise one or more still images (e.g., pictures, photographs, computer-aided drawings, 2D renderings of a scene, etc.) and/or one or more videos (e.g., motion pictures, recordings, etc.). Additionally, or alternatively, the localized camera data 108, as shown, may be any camera parameter data representative of one or more of a zoom factor (or focal length), position, orientation, and/or any other camera parameters for a calibrated and/or localized camera (e.g., electronic device 600, camera 120B, or the like) of a preexisting (or previously installed) camera system (and/or camera rig). For example, a retail store (or any other location) may comprise an existing (previously installed) security system comprising a plurality of calibrated and localized cameras (e.g., ceiling mounted security cameras). Additionally, the cameras of the security system may capture image data (e.g., image frames, still pictures, video, etc.) representative of a planar scene (e.g., a checkout lane, and/or the like) from various points-of-view. Further, the security system may comprise a database (or the like stored to memory) comprising camera parameter data associated with each camera, point-of-view, and/or image frame associated with the localized camera data 108. In addition, the preexisting (or previously installed) camera system may transmit (or provide via an intermediate storage device) the localized camera data 108 (e.g., comprising the image data and/or the camera parameter data) to the system 100 to determine one or more camera parameters for an unlocalized camera and/or perform one or more processes (e.g., process 700) as described herein. In some such examples, the system 100 may use the localized camera data 108 to facilitate installation (e.g., calibration, localization, and/or the like) of one or more additional cameras into the preexisting (or previously installed) camera system. For example, during maintenance a previously installed camera (e.g., that is broken, malfunctioning, etc.) may be replaced with a new camera and the new camera may be localized using the localized camera data 108 and one or more processes (e.g., process 700) described herein. Additionally, or alternatively, a user (e.g., retail store owner, company, etc.) may incorporate additional cameras into a security system (e.g., to expand visual coverage of a store) and the additional cameras may be calibrated and/or localized based, at least in part, on the localized camera data 108 generated by one or more of the preexisting (or previously installed) cameras. In some examples, the preexisting (or previously installed) cameras may be one or more of a security camera, a fixed (or permanent) camera, and/or any electronic device and/or camera that is installed for long-term use (e.g., more that day, week, month, or any other unit of time) at a location (e.g., store, arena, stadium, etc.) as described herein. In some examples, the scene scan data 106 and/or the localized camera data 108 may comprise one or more templates of a planar scene (as described above).

The keypoint matching model(s) 112, as shown, may be one or more of any software (e.g., machine learning model, artificial neural network, computer readable/executable instruction, algorithm(s), etc.), firmware, and/or dedicated hardware (e.g., Field-Programmable Gate Array (FPGA), Application-Specific Integrated Circuit (ASIC), Application-Specific Standard Products (ASSP), System on a Chip (SoC), Complex Programmable Logic Device (CPLD), etc.), and/or the like as described herein for, at least in part, detecting and/or matching a keypoint (e.g., reference point, recognizable and/or identifiable feature, object, fixture, marking, etc.) in a planar scene and/or on a planar surface. For example, a first camera (e.g., camera 120A) and a second camera (e.g., camera 120B) may capture image data representative of a tile floor in a store. In some such examples, the keypoint matching model(s) 112 may detect (or identify) a first pixel representative of the point (or keypoint), such as where the corners of four tiles meet in the image data of the first camera. In addition, the keypoint matching model(s) 112 may detect (or identify) a second pixel representative of the point (or keypoint), such as where the corners of four tiles meet in the image data of the second camera. In some examples, the keypoint matching model(s) 112 may generate and/or record (e.g., to a storage device) keypoint matching data comprising an indication that matches (or links) the identified point (or keypoint) with the first pixel (e.g., pixel coordinates in an image frame) and second pixel (e.g., pixel coordinates in an image frame). In some examples, the keypoint matching model(s) 112 may be a system comprising a plurality of software (as described herein). In some such examples, the plurality of software may comprise a detection model (and/or algorithm(s)) (e.g., for identifying and/or detecting keypoints and/or any other data points as described herein) and a matching model (and/or algorithm(s)) (e.g., for matching and/or compiling the same, or similar, keypoints or any other data points as described herein into sets of points).

In some examples, the keypoint matching model(s) 112 may detect (or identify) a keypoint (e.g., reference point, recognizable and/or identifiable feature, object, fixture, marking, etc.) using one or more computer vision techniques including, without limitation, image classification, localization of objects using bounding boxes, image segmentation, facial and/or person recognition, object recognition, edge detection, and/or any other recognition and/or identification techniques described herein. For example, the keypoint matching model(s) 112 may utilize object recognition to identify one or more keypoints in one or more image frames. Example keypoints may comprise one or more of a corner (e.g., of a counter, table, floor tile, chair, etc.), an edge (e.g., of a counter, table, floor tile, etc.), a blob (e.g., a region in an image frame that differs in brightness, color, or another characteristic from its surroundings), and/or any other identifiable (or recognizable) points (e.g., stickers, paint markings, signs, and/or the like). In some examples, the keypoint matching model(s) 112 may utilize bounding boxes to identify a keypoint and/or one or more associated pixels across a plurality of image frames (e.g., pictures, video, etc.). In some examples, the keypoint matching model(s) 112 may comprise one or more machine learning models (e.g., artificial neural networks, etc.) trained on historical image data (e.g., stored in a machine learning database on memory 604) for a particular location (e.g., a specific arena, a specific store branch, etc.). In some examples, the keypoint matching model(s) 112 may comprise one or more algorithms (or operators) that utilize (or leverage), without limitation, Scale-Invariant Feature Transform (SIFT), Canny edge detector, Harris corner detector, Features from Accelerated Segment Test (FAST), and/or any other keypoint detection techniques.

The homographies computation data 110, as shown, may be any data (e.g., image data, camera parameter data, keypoint matching data, and/or the like), algorithms, and/or models for generating one or more homographies, homographic transformations, and/or homography matrices as described herein. For example, an electronic device (e.g., electronic device 600) of the system 100 may receive any or all of the input data 102 and/or the keypoint matching data (e.g., of keypoint matching model(s) 112) and, in response, may generate (or compute) one or more homographies (e.g., homography matrices, homographic transformations, etc.) representative of a relationship between a planar scene (or planar surface) and at least one image frame (and/or image plane) (e.g., generated by any or all of cameras 120A-120N).

As shown, the homographies computation data 110 may comprise keypoint image data 104A comprising, at least in part, the unlocalized image data 104 with keypoints 114 identified in each respective image frame (and/or image plane) of the unlocalized image data 104. The keypoint image data 104A may comprise some or all of the input data 102 (e.g., at least a portion of one or more of the unlocalized image data 104, the scene scan data 106, and/or the localized camera data 108) as described above. Additionally, or alternatively, the keypoint image data 104A may comprise some or all of the keypoints identified by the keypoint matching model(s) 112 as described above. For example, keypoints 114 may identify shared (or common) keypoints that are visible in one or more image frames of the unlocalized image data 104 and/or any other image data described above in connection with the input data 102 (e.g., image data generated by one or more of a mobile camera, a preinstalled camera, and/or the like). In some examples, the homographies computation data 110 may comprise any or all data (e.g., homographies, points, keypoints, datapoint, algorithms, models, transformations, and/or the like) described below in connection with at least FIGS. 4 and 5. For example, the homographies computation data 110 may comprise, at least in part, the image frames (e.g., image frame 402, image frame 404, image frame 408, or the like) shown in FIG. 4 and/or the homography 500 (or the like) shown in FIG. 5.

The minimal solver 116, as shown, may comprise one or more of any software (e.g., hypothesis algorithm, minimal solver algorithm, etc.), firmware, and/or dedicated hardware (e.g., FPGA, ASIC, ASSP, SoC, CPLD, etc.), and/or the like as described herein for solving a problem (or generating a solution) using a (minimum) number of datapoints (e.g., image frames, keypoints, camera parameters, etc.). In some examples, the minimal solver 116 may receive, at least in part, the input data 102 and the homographies computation data 110 and then, as shown, output the suggested solutions data 118. For example, the system 100 may feed (or input), into the minimal solver 116, at least one image frame of the unlocalized image data 104, three (or any other number) of the image frames from the scene scan data 106 (and/or the localized camera data 108), and keypoint matching data from the keypoint matching model(s) 112. It should be understood that the three (or any other number) image frames from the scene scan data 106 (and/or the localized camera data 108) may be from only the scene scan data 106, only the localized camera data 108, or any combination of both (e.g., one image frame from the scene scan data 106 and two image frames from the localized camera data 108, or any other combinations of any other numbers).

In addition, the keypoint matching data from the keypoint matching model(s) 112 may comprise data that maps the keypoints of a planar scene (or planar surface) to respective pixels in each of the image frames (e.g., the at least one image frame of the unlocalized image data 104 and each of the three (or any other number) of image frames from the scene scan data 106 (and/or the localized camera data 108). In some examples, the keypoint matching data may comprise a (unique or distinct) keypoint identifier (e.g., name, number, code, etc.) for each recognized feature (or keypoint), a (unique or distinct) image frame identifier (e.g., name, number, code, etc.) for each image frame, and a (unique or distinct) pixel identifier (e.g., pixel coordinates, etc.) for each pixel associated with each keypoint in each image frame. In some examples, the minimal solver 116 may utilize a three-dimensional (3D) model (e.g., model 400 described below in connection with FIG. 4) to determine one or more hypotheses (or suggested solutions) and/or generate (or output) the suggested solutions data 118 as described below.

The suggested solutions data 118, as shown, may be any data (e.g., hypothesis data, solution data, etc.) and/or the like as described herein that indicates a plurality of camera parameters for a plurality of cameras (e.g., any or all of cameras 120A-120N) of a multi-camera system. As shown, the suggested solutions data 118 may comprise a plurality of solution datasets comprising one or more of solution 118A, solution 118B, solution 118N, and/or any similar solutions indicating one or more camera parameters (e.g., intrinsic camera parameters, extrinsic camera parameters, and/or the like) for a plurality of cameras (e.g., any or all of cameras 120A-120N) of a multi-camera system. For example, the solution 118A may comprise a position and/or an orientation for each camera identified in the input data 102. In some examples, the position and/or the orientation for any or all calibrated and/or localized cameras (e.g., a mobile camera, a preinstalled camera, or the like) may be a known position and/or orientation. In some examples, the position and/or the orientation for any or all uncalibrated and/or unlocalized cameras may be a suggested (or hypothesized) position and/or orientation.

The position data identified with a camera may comprise one or more of a translation vector (e.g., a distance (or magnitude) and direction relative to one or more keypoints of a planar surface or scene), coordinates (e.g., GPS coordinates, planar coordinates of a planar coordinate system 502 described below in connection with FIG. 5), and/or any other data representative of a position (or location) of a camera within an environment and/or in relation to a feature (e.g., keypoint) or an object (e.g., another camera, a planar surface, a table, a chair, a counter, the floor or ground, etc.).

The orientation data identified with a camera may comprise one or more of an angle of rotation around one or more axes of the camera (e.g., pan or yaw, tilt or pitch, roll, or any combination thereof), and/or any other data representative of an orientation (or angle) of a camera within an environment and/or in relation to a feature (e.g., keypoint) or an object (e.g., another camera, a planar surface, a table, a chair, a counter, the floor or ground, etc.). In some examples, a solution (e.g., any or all of solutions 118A-118N) may comprise a camera identifier (e.g., for each respective camera identified by the solution) and each camera identifier may be linked (or mapped) (e.g., in a dataset, data table, etc.) to that respective camera's associated position data, orientation data, and/or any other camera parameters described herein.

The inaccuracy resolver 122, as shown, may comprise one or more of any software (e.g., algorithm, artificial neural network, etc.), firmware, and/or dedicated hardware (e.g., FPGA, ASIC, ASSP, SoC, CPLD, etc.), and/or the like as described herein for resolving (or removing) any or all incorrect solutions and/or inconsistent solutions from the suggested solutions data 118. In some examples, the inaccuracy resolver 122 may remove (or delete) (e.g., from the plurality of solutions of the suggested solutions data 118) one or more of an incorrect solution, an inconsistent solution, and/or the like (e.g., in order to generate, at least in part, the output data 124). In some examples, the inaccuracy resolver 122 may receive, at least in part, the suggested solutions data 118 (e.g., known and hypothesized camera parameters and/or the like), known parameters (or features) of a location (e.g., a height (or Z-coordinate) of a ceiling or floor, wall coordinates, etc.) and then, as shown, output the output data 124 comprising at least one solution. In some examples, the inaccuracy resolver 122 may compare each solution of the suggested solutions data 118 to known parameters of a location (e.g., using a 3D model of the location) to determine whether one or more of the position, orientation, and/or other camera parameter for a respective camera in the solution (e.g., any or all of solutions 118A-118N) are possible based on the location (e.g., an incorrect solution may place a camera below the floor or above a ceiling).

Additionally, or alternatively, the inaccuracy resolver 122 may compare hypothesized camera parameters (e.g., for an unlocalized camera) to known camera parameters (e.g., for a localized camera) to determine whether the solution is internally consistent with itself. For example, if the hypothesized position of an unlocalized camera is inconsistent (or conflicts) with a known position of a preexisting (or localized) camera then the solution (e.g., as overall, as a whole, etc.) may be wrong. In some examples, an inconsistent solution may be one or more solutions comprising an inconsistent localization parameter representing a location for the first camera that is inconsistent with the second point-of-view of the second camera. For example, the inaccuracy resolver 122 may label any or all solutions (e.g., in the plurality of suggested solutions) as inconsistent if the position and/or orientation of a first camera in the solution causes the first camera's point-of-view (or image plane) of the planar scene to not align (or to disagree) with at least a second camera's point-of-view (or image plane) of the same planar scene as represented by image data generated by each respective camera.

The output data 124, as shown, may be any data (e.g., hypothesis data, solution data, camera parameters data, etc.) and/or the like as described herein that indicates a plurality of camera parameters for a plurality of cameras (e.g., any or all of cameras 120A-120N) of a multi-camera system. As shown, the output data 124 may comprise a solution dataset comprising the solution 126 indicating one or more camera parameters (e.g., intrinsic camera parameters, extrinsic camera parameters, and/or the like) for a plurality of cameras (e.g., any or all of cameras 120A-120N) of a multi-camera system. For example, the solution 126 may comprise a position and/or an orientation for each camera identified in the input data 102. In some examples, the position and/or the orientation for any or all calibrated and/or localized cameras (e.g., a mobile camera, a preinstalled camera, or the like) may be a known position and/or orientation. In some examples, the position and/or the orientation for any or all uncalibrated and/or unlocalized cameras may be a suggested (or hypothesized) position and/or orientation. As shown, the solution 126 may be a suggested solution (e.g., any of solutions 118A-118N from the suggested solutions data 118) that is possible at a respective location (e.g., retail store, arena, etc.) and is internally consistent with itself (e.g., no two camera positions, or orientations, are in conflict with each other or the environment). For example, the solution 126 may be the only suggested solution that is not labeled as an incorrect solution or inconsistent solution by the inaccuracy resolver 122.

In some examples, the output data 124 may comprise updated camera data 128. In some such examples, the updated camera data 128 may be the same as (or similar to) the localized camera data 108 with the addition of the camera parameters for any or all uncalibrated and/or unlocalized cameras (e.g., associated with the unlocalized image data 104). In some such examples, the system 100 may store (e.g., to memory 604, etc.), at least in part, the solution 126 with (or in) the localized camera data 108 in order to generate the updated camera data 128. In some examples, the updated camera data 128 may comprise the unlocalized image data 104 (e.g., for each previously unlocalized camera as described above).

Now that example systems for camera localization have been described above with reference to at least FIG. 1, additional example systems for camera localization will now be described below with reference to FIG. 2.

Figure 2:
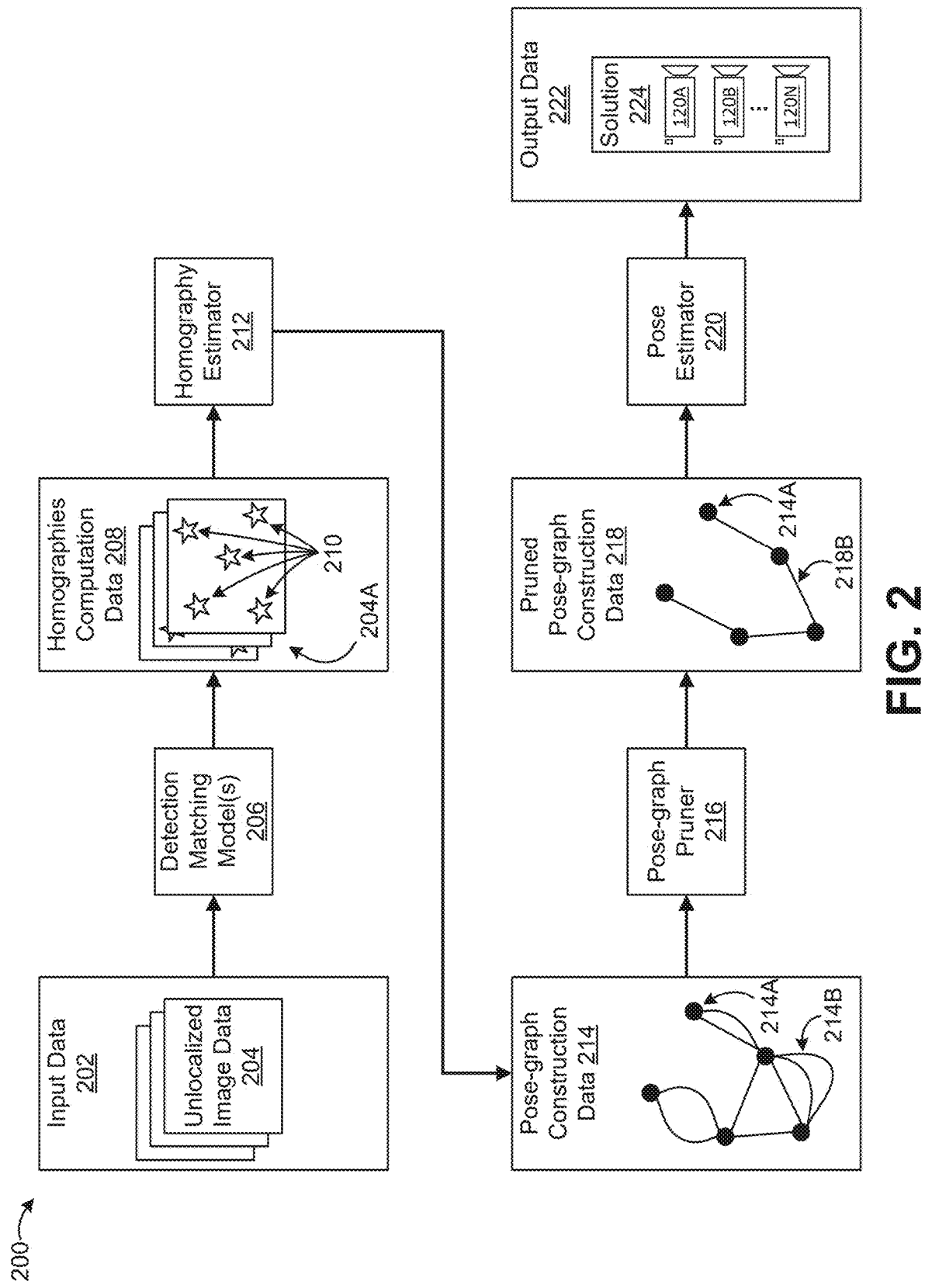
FIG. 2 illustrates example systems for camera localization, in accordance with various aspects of the present disclosure.

FIG. 2 illustrates example systems for camera localization, in accordance with various aspects of the present disclosure. As shown, the system 200 may comprise input data 202, one or more detection matching model(s) 206, homographies computation data 208, a homography estimator 212, pose-graph construction data 214, a pose-graph pruner 216, pruned pose-graph construction data 218, a pose estimator 220, and/or output data 222. The system 200 may comprise one or more electronic devices (e.g., electronic device 600 as described below in connection with FIG. 6)

configured to facilitate a camera localization pipeline, as shown in FIG. 2, for determining one or more camera parameters (described herein) for one or more cameras. In some examples, the system 200 may comprise, at least in part, the system 100 as described above in connection with FIG. 1.

For example, one or more electronic devices may execute (e.g., using processor(s) 602) one or more of the detection matching model(s) 206, the homography estimator 212, pose-graph pruner 216, and/or pose estimator 220. Additionally, or alternatively, the one or more electronic devices may store (e.g., using memory 604) one or more of the input data 202, the homographies computation data 208, the pose-graph construction data 214, the pruned pose-graph construction data 218, and/or the output data 222. In some examples, the one or more electronic devices may be communicatively coupled through one or more communications networks (e.g., using network interface(s) 606) in order to exchange data with each other and/or any other electronic devices described herein, such as servers, laptops, mobile devices, cameras, and/or the like.

The input data 202, as shown, may be any image data and/or camera data as described herein for generating one or more homographics and/or determining one or more camera parameters. As shown, the input data 102 may comprise unlocalized image data 204. In some examples, the input data 202 may comprise, at least in part, the input data 102 as described above in connection with FIG. 1. For example, the input data 202 may comprise the scene scan data 106, the localized camera data 108, and/or the like.

The unlocalized image data 204, as shown, may be any image data representative of still images (or pictures) and/or video. In some examples, image data (e.g., unlocalized image data 204, etc.) may comprise one or more still images (e.g., pictures, photographs, computer-aided drawings, 2D renderings of a scene, etc.) and/or one or more videos (e.g., motion pictures, recordings, etc.). In addition, the unlocalized image data 204 may be image data generated by an unlocalized camera (e.g., electronic device 600, camera 120A or the like). In some examples, the unlocalized image data 204 may comprise, at least in part, the unlocalized image data 104 as described above in connection with FIG. 1. For example, an unlocalized camera may transmit (or provide via an intermediate storage device, such as a server, Network Attached Storage (NAS), etc.) the unlocalized image data 204 to the system 200 for the system 200 to determine one or more camera parameters for the unlocalized camera. In some such examples, the system 200 may utilize the one or more camera parameters to calibrate and/or localize the unlocalized camera using one or more processes (e.g., process 700) as described herein. As shown, the unlocalized image data 204 may comprise one or more images (or image frames) comprising a planar scene, a planar surface, an image plane, and/or the like as described herein. In some examples, the unlocalized camera may be any camera (as described herein) comprising unknown camera parameters (e.g., position, orientation, focal length, etc.). Additionally, or alternatively, the unlocalized camera may be a camera (e.g., camera 120A or the like) of a multi-camera system (e.g., comprising any or all of the cameras 120A-120N). In some examples, the multi-camera system may be deployed at a sports venue, a retail location, and/or any other locations as described herein. In some examples, the unlocalized image data 204 may comprise one or more images (e.g., image frames, still pictures, video, etc.) from any or all cameras of a multi-camera system to be localized relative to each other, a keypoint (or reference point), and/or a location (or an environment).

The detection matching model(s) 206, as shown, may be one or more of any software (e.g., machine learning model, artificial neural network, computer readable/executable instruction, algorithm(s), etc.), firmware, and/or dedicated hardware (e.g., FPGA, ASIC, ASSP, SoC, CPLD, etc.), and/or the like as described herein for, at least in part, detecting and/or matching a keypoint (e.g., reference point, recognizable and/or identifiable feature, object, fixture, marking, etc.) in a planar scene and/or on a planar surface. In some examples, the detection matching model(s) 206 may be a system comprising a plurality of software (as described herein). In some such examples, the plurality of software may comprise a detection model (and/or algorithm(s)) (e.g., for identifying and/or detecting keypoints and/or any other data points as described herein) and a matching model (and/or algorithm(s)) (e.g., for matching and/or compiling the same, or similar, keypoints or any other data points as described herein into sets of points).

In some examples, the detection matching model(s) 206 may comprise, at least in part, the keypoint matching model(s) 112 as described above in connection with FIG. 1. For example, a first camera (e.g., camera 120A) and a second camera (e.g., camera 120B) may capture image data representative of a basketball court in an arena. In some such examples, the detection matching model(s) 206 may detect (or identify) a first pixel representative of a point (or keypoint), such as where the free throw line intersects (or meets) the free throw lane boundaries in the image data of the first camera. In addition, the detection matching model(s) 206 may detect (or identify) a second pixel representative of the point (or keypoint), such as where the free throw line intersects (or meets) the free throw lane boundaries in the image data of the second camera. In some examples, the detection matching model(s) 206 may generate and/or record (e.g., to a storage device) keypoint matching data comprising an indication that matches (or links) the identified point (or keypoint) with the first pixel (e.g., pixel coordinates in an image frame) and second pixel (e.g., pixel coordinates in an image frame).

In some examples, the detection matching model(s) 206 may detect (or identify) a keypoint (e.g., reference point, recognizable and/or identifiable feature, object, fixture, marking, etc.) using one or more computer vision techniques including, without limitation, image classification, localization of objects using bounding boxes, image segmentation, facial and/or person recognition, object recognition, edge detection, and/or any other recognition and/or identification techniques described herein. For example, the detection matching model(s) 206 may utilize object recognition to identify one or more keypoints in one or more image frames (e.g., a pair of image frames comprising one image from two respective cameras). In some examples, the detection matching model(s) 206 may utilize bounding boxes to identify a keypoint and/or one or more associated pixels across a plurality of image frames (e.g., pictures, video, etc.). In some examples, the detection matching model(s) 206 may comprise one or more machine learning models (e.g., artificial neural networks, etc.) trained on historical image data (e.g., stored in a machine learning database on memory 604 or the like) for a particular location (e.g., a specific arena, a specific store branch, etc.). In some examples, the detection matching model(s) 206 may comprise one or more algorithms (or operators) that utilize (or leverage), without limitation, Scale-Invariant Feature Transform (SIFT), Canny edge detector, Harris corner detector, Features from Accelerated Segment Test (FAST), and/or any other keypoint detection techniques.

The homographies computation data 208, as shown, may be any data (e.g., image data, camera parameter data, keypoint matching data, and/or the like), algorithms, and/or models for generating one or more homographies, homographic transformations, and/or homography matrices as described herein. In some examples, the homographies computation data 208 may comprise, at least in part, the homographies computation data 110 as described above in connection with FIG. 1. For example, an electronic device (e.g., electronic device 600) of the system 200 may receive any or all of the input data 202 and/or the keypoint matching data (e.g., of detection matching model(s) 206) and, in response, may generate (or compute) one or more homographies (e.g., homography matrices, homographic transformations, etc.) representative of a relationship between a planar scene (or planar surface) and at least one image frame (and/or image plane) (e.g., generated by any or all of cameras 120A-120N).

As shown, the homographies computation data 208 may comprise keypoint image data 204A comprising, at least in part, the unlocalized image data 204 with keypoints 210 identified in each respective image frame (and/or image plane) of the unlocalized image data 204. The keypoint image data 204A may comprise some or all of the input data 202 (e.g., at least a portion of one or more of the unlocalized image data 204 and/or the like) as described above. The keypoint image data 204A may comprise, at least in part, the keypoint image data 104A as described above in connection with FIG. 1. Additionally, or alternatively, the keypoint image data 204A may comprise some or all of the keypoints identified by the detection matching model(s) 206 as described above. For example, keypoints 210 may identify shared (or common) keypoints that are visible in one or more image frames of the unlocalized image data 204 and/or the like. In some examples, the homographies computation data 208 may comprise any or all data (e.g., homographies, points, keypoints, datapoint, algorithms, models, transformations, and/or the like) described below in connection with at least FIGS. 4 and 5. For example, the homographics computation data 208 may comprise, at least in part, the image frames (e.g., image frame 402, image frame 404, image frame 408, or the like) shown in FIG. 4 and/or the homography 500 (or the like) shown in FIG. 5. In some examples, the homographies computation data 208 may be used to generate one or more homographies and/or pose-graphs using, at least in part, the homography estimator 212.

The homography estimator 212, as shown, may comprise one or more of any software (e.g., hypothesis algorithm, pose-graph generation algorithm, etc.), firmware, and/or dedicated hardware (e.g., FPGA, ASIC, ASSP, SoC, CPLD, etc.), and/or the like as described herein for estimating a homography (e.g., based on the keypoint image data 204A and/or the like) and/or for generating a pose-graph (and/or pose-graph construction data 214). For example, the system 200 may feed (or input), at least in part, the homographies computation data 208 into the homography estimator 212 to generate the pose-graph construction data 214. In some examples, the homography estimator 212 may generate (or estimate) one or more homographics for each pair of image frames comprising one image from two respective cameras (e.g., as identified by, and described above in connection with, the detection matching model(s) 206). The homography estimator 212 may generate (or estimate) one or more homographies for each observed planar surface (e.g., in a planar scene represented in the image frames). In such examples, the one or more homographies may relate each observed planar surface with each image frame of the pair of image frames (e.g., as described below in connection with FIG. 4). Once the homography estimator 212 generates (or estimates) the one or more homographies, the homography estimator 212 may construct (or generate) a pose-graph and/or the pose-graph construction data 214. In some examples, the homography estimator 212 may be configured to extract features (e.g., keypoints 210 and/or the like) from the keypoint image data 204A, match the extracted features between image frames, estimate the relative pose (e.g., position, orientation, etc.) for each image frame (and/or camera that generated the image frame), and construct a pose-graph (and/or output the pose-graph construction data 214).

The pose-graph construction data 214, as shown, may be any data (e.g., a plurality of solutions, positions, orientations, camera parameters, poses, homographic transformations, and/or the like) that indicates a plurality of poses and/or homographic transformation for a plurality of cameras (e.g., any or all of cameras 120A-120N) of a multi-camera system. As shown, the pose-graph construction data 214 may comprise a pose-graph (and/or pose-graph construction) comprising a plurality of nodes (e.g., node 214A and/or the like) connected by a plurality of edges (e.g., edge 214B and/or the like).

Each node (e.g., node 214A and/or the like) in the pose-graph construction data 214 may represent a pose for a camera (e.g., any of cameras 120A-120N). In addition, a pose may comprise (or define) position data (as described above) and/or orientation data (as described above) of the camera. For example, the node 214A may represent a pose comprising a position, an orientation, and/or any other camera parameters for the camera 120A. In some examples, a node of the plurality of nodes may represent a pose that is associated with a first image plane of a first camera, a second image plane of a second camera, and/or the any other image plane.

Each edge (e.g., edge 214B and/or the like) in the pose-graph construction data 214 may represent a homographic transformation between two camera poses. In addition, an edge may comprise (or define) a homographic transformation to transition from a first node (or pose) to a second node (or pose). For example, the edge 214B may represent a transformation (or transition) comprising one or more spatial constraints (e.g., sensor constraints, geometric constraints, etc.) between poses. In some examples, an edge of the plurality of edges may represent a transformation (or transition) between a first image plane of a first camera and a second image plane of a second camera.

The pose-graph pruner 216, as shown, may comprise one or more of any software (e.g., algorithm, artificial neural network, etc.), firmware, and/or dedicated hardware (e.g., FPGA, ASIC, ASSP, SoC, CPLD, etc.), and/or the like as described herein for resolving (or removing) any or all redundancies from the pose-graph construction data 214. For example, the pose-graph pruner 216 may comprise a geometry-based graph pruning algorithm (and/or the like) to remove (or delete) redundant nodes and/or redundant edges from a pose-graph. It should be understood that pruning the pose-graph construction data 214 may be beneficial to reduce the size of the dataset, reduce the computational load (e.g., on processor(s) 602, memory 604, etc.) for processing and storing the dataset, and improve the accuracy of the pose-graph (e.g., as it relates to the real-world environment and multi-camera system configuration). In some examples, the pose-graph pruner 216 may map one or more homographies (e.g., homography 500 or any homographies described herein) onto a real-line (described below) to enable (or facilitate) the removal of edges and/or nodes (as described below) that do not belong to a spanning tree that minimizes the consistency measure of the mappings (e.g., of the pose-graph).

In some examples, the pose-graph pruner 216 may remove (or delete), from the pose-graph construction data 214 one or more of a redundant node, a redundant edge, and/or the like (e.g., in order to generate, at least in part, the pruned pose-graph construction data 218). In some examples, the pose-graph pruner 216 may receive, at least in part, the pose-graph construction data 214 and then, as shown, output the pruned pose-graph construction data 218 representative of at least one solution (e.g., solution 224 or the like). In some examples, the pose-graph pruner 216 may compare one or more nodes of the pose-graph construction data 214 to any (or each) other node of the pose-graph construction data 214 to determine whether one or more of the nodes represent one or more of the same pose (e.g., a redundant node), an incorrect pose (e.g., an incorrection solution as described above), an inconsistent pose (e.g., an inconsistent solution as described above), and/or the like.

Additionally, or alternatively, the pose-graph pruner 216 may compare one or more edges of the pose-graph construction data 214 to any (or each) other edge of the pose-graph construction data 214 to determine whether one or more of edges represent one or more of the same transformation (e.g., a redundant edge), an incorrect transformation (e.g., an incorrection solution as described above), an inconsistent transformation (e.g., an inconsistent solution as described above), and/or the like. As shown, the pruned pose-graph construction data 218 comprises, at least in part, the pose-graph construction data 214 with various redundant, incorrect, and/or inconsistent edges removed. For example, the node 214A in the pose-graph construction data 214 is connected to its neighboring node via two edges and, in the pruned pose-graph construction data 218, the redundant edge (e.g., represented by a curved line in the pose-graph construction data 214) has been removed. Additionally, or alternatively, the pose-graph pruner 216 may remove the edge 214B (and other redundant edges) from the pruned pose-graph construction data 218 as shown. In some examples, the edge 218B may represent a real-line edge between its two respective nodes and the edge 214B may represent a redundant, incorrect, and/or inconsistent edge between the same two respective nodes.

In some examples, the pose-graph pruner 216 may be configured to map, onto a pose-graph, a real-line edge representing a real transformation between two nodes. In some examples, a real-line edge (or real transformation) may comprise (or be based on) real-world observation data, such as collected (or measurable) by sensor data (e.g., image sensors, range finders, etc.). For example, a real-line edge may be an edge that was generated based on known data associated with two or more preexisting (or preinstalled) cameras of a preexisting multi-camera system. Additionally, or alternatively, a real-line edge may be an edge that was generated based on known data associated with two or more positions (or points-of-view) captured by one or more mobile cameras (e.g., GPS data collected at two locations associated with a mobile camera during the scan of a planar scene).

The pruned pose-graph construction data 218, as shown, may be any data (e.g., a plurality of solutions, positions, orientations, camera parameters, poses, homographic transformations, and/or the like) that indicates one or more poses and/or homographic transformation for a plurality of cameras (e.g., any or all of cameras 120A-120N) of a multi-camera system. As shown, the pruned pose-graph construction data 218 may comprise a pruned pose-graph (and/or pruned pose-graph construction) comprising a plurality of nodes (e.g., node 214A and/or the like) with pairs of nodes connected by respective edges (e.g., a real-line edge, edge 218B and/or the like).

The pose estimator 220, as shown, may comprise one or more of any software (e.g., algorithm, artificial neural network, computer vision model, etc.), firmware, and/or dedicated hardware (e.g., FPGA, ASIC, ASSP, SoC, CPLD, etc.), and/or the like as described herein for determining at least a solution (e.g., solution 224 and/or the like) from the pruned pose-graph construction data 218. For example, the pose estimator 220 may comprise a computer vision algorithm (and/or the like) configured to determine (or estimate) a position and/or an orientation for one or more cameras (e.g., an unlocalized camera, any or all of cameras 120A-120N, etc.). In some examples, the pose-graph pruner 216 may generate, at least in part, the output data 222 (described below) based on the pruned pose-graph construction data 218.

The output data 222, as shown, may be any data (e.g., hypothesis data, solution data, camera parameters data, etc.) and/or the like as described herein that indicates a plurality of camera parameters for a plurality of cameras (e.g., any or all of cameras 120A-120N) of a multi-camera system. In some examples, the output data 222 may comprise, at least in part, the output data 124 as described above in connection with FIG. 1. As shown, the output data 222 may comprise a solution dataset comprising the solution 224 indicating one or more camera parameters (e.g., intrinsic camera parameters, extrinsic camera parameters, and/or the like) for a plurality of cameras (e.g., any or all of cameras 120A-120N) of a multi-camera system. For example, the solution 224 may comprise a position and/or an orientation for each camera identified by the unlocalized image data 204 of the input data 202. In some examples, the position and/or the orientation for any or all calibrated and/or localized cameras (e.g., a mobile camera, a preinstalled camera, or the like) may be a known (or real) position and/or orientation. In some examples, the position and/or the orientation for any or all uncalibrated and/or unlocalized cameras may be a suggested (or hypothesized) position and/or orientation.

As shown, the solution 224 may be a best-fit solution determined from the pruned pose-graph construction data that is possible at a respective location (e.g., retail store, arena, etc.) and is internally consistent with itself (e.g., no two camera positions, orientations, and/or transformations are in conflict with each other or the environment). For example, the solution 224 may be the only solution represented by the pruned pose-graph construction data 218 (e.g., after all redundant data, and/or the like, is removed from the pose-graph construction data 214). In some examples, the output data 222 may, at least in part, be used to update a database (e.g., localized camera data 108, updated camera data 128, and/or the like) comprising camera data of a multi-camera system.

Now that example systems for camera localization have been described above with reference to FIGS. 1 and 2, additional example systems for camera localization will now be described below with further reference to FIG. 3.

Figure 3:
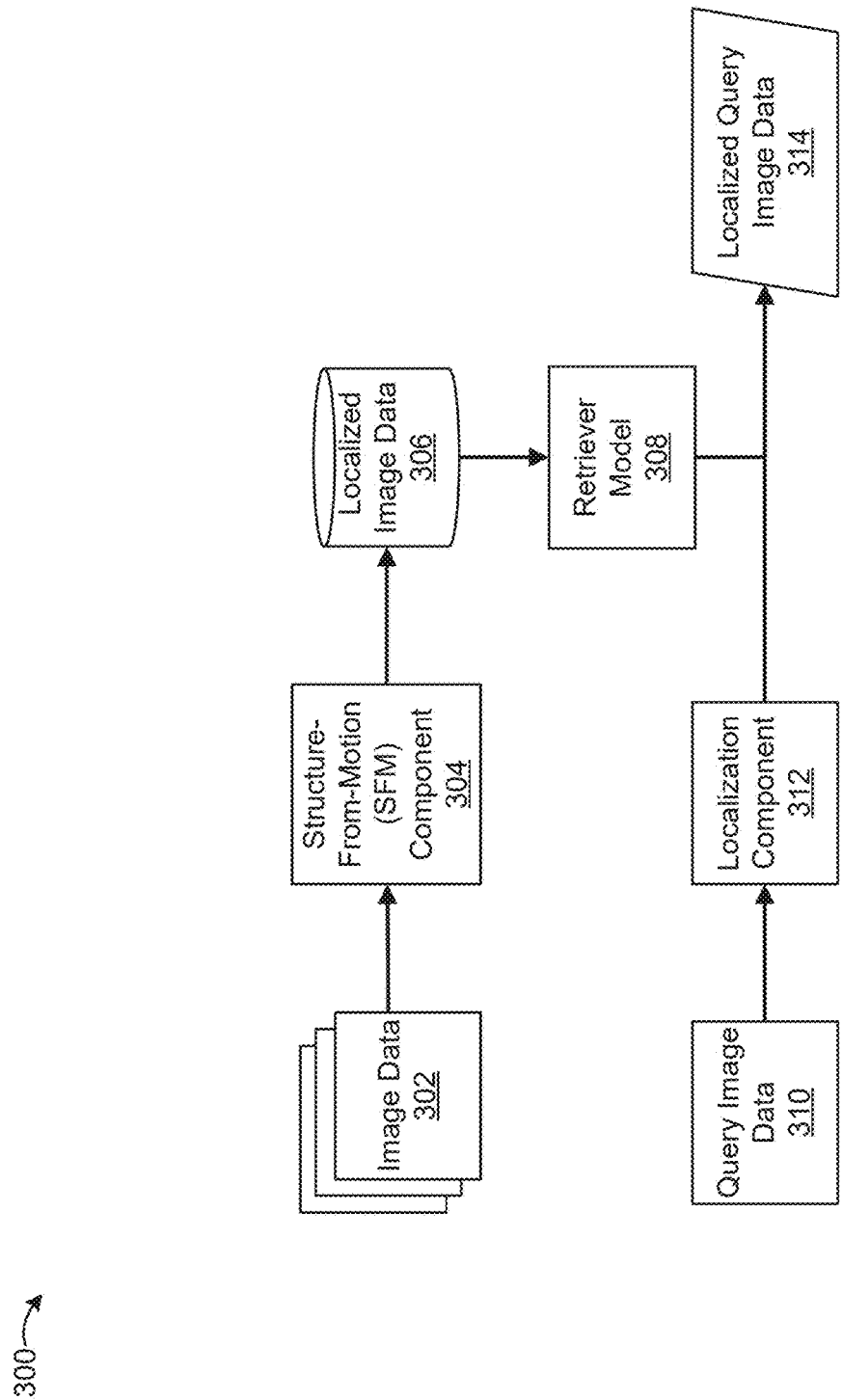
FIG. 3 illustrates example systems for camera localization, in accordance with various aspects of the present disclosure.

FIG. 3 illustrates example systems for camera localization, in accordance with various aspects of the present disclosure. As shown, the system 300 may comprise image data 302, a Structure-From-Motion (SFM) component 304, localized image data 306, a retriever model 308, query image data 310, a localization component 312, and/or localized query image data 314. The system 300 may comprise one or more electronic devices (e.g., electronic device 600 as described below in connection with FIG. 6) configured to facilitate a camera localization pipeline, as shown in FIG. 3, for determining one or more camera parameters (described herein) for one or more cameras. In some examples, the system 300 may comprise, at least in part, the system 100 as described above in connection with FIG. 1. In some examples, the system 300 may comprise, at least in part, the system 200 as described above in connection with FIG. 2.

For example, one or more electronic devices may execute (e.g., using processor(s) 602) one or more of the SFM component 304, the retriever model 308, the localization component 312, and/or any other model as described herein. Additionally, or alternatively, the one or more electronic devices may store (e.g., using memory 604) one or more of the image data 302, the localized image data 306, the query image data 310, the localized query image data 314, and/or any other data as described herein. In some examples, the one or more electronic devices may be communicatively coupled through one or more communications networks (e.g., using network interface(s) 606) in order to exchange data with each other and/or any other electronic devices described herein, such as servers, laptops, mobile devices, cameras, and/or the like.

The image data 302, as shown, may be any image data and/or camera data as described herein for estimating (or generating) 3D structures (e.g., 3D models, templates, and/or the like using SFM techniques) and/or for determining one or more camera parameters. In some examples, image data (e.g., image data 302, etc.) may comprise one or more still images (e.g., pictures, photographs, computer-aided drawings, 2D renderings of a scene, etc.) and/or one or more videos (e.g., motion pictures, recordings, etc.). In some examples, the image data 302 may comprise, at least in part, the input data 102 as described above in connection with FIG. 1. Additionally, or alternatively, the image data 302 may comprise, at least in part, the unlocalized image data 204 as described above in connection with FIG. 2. In some examples, the image data 302 may be any image data representative of still images (or pictures) and/or video. In addition, the image data 302 may be image data generated by an unlocalized camera (e.g., electronic device 600, camera 120A or the like) and/or a localized camera (e.g., electronic device 600, camera 120B, a mobile camera, a preinstalled camera, and/or the like).

The SFM component 304, as shown, may be any dedicated hardware (e.g., FPGA, ASIC, ASSP, SoC, CPLD, etc.) or a combination of dedicated hardware and software (e.g., machine learning model, artificial neural network, computer readable/executable instruction, etc.), firmware, and/or the like as described herein for, at least in part, performing one or more photogrammetric techniques. For example, the SFM component 304 may be configured to estimate 3D structures from one or more two-dimensional (2D) images (e.g., image data 302, scene scan data 106, etc.).

In some examples, the SFM component 304 may generate a template by reconstructing a 3D structure and/or a planar scene. For example, the SFM component 304 may receive 2D image data (e.g., image data 302, image frames, pictures, video, images from multiple points-of-view, etc.) representing, at least in part, a self-checkout lane at a grocery store and, based on the image data, the SFM component 304 may construct (or reconstruct) a 3D model (e.g., generate 3D model data, etc.) representing, at least in part, the self-checkout lane at the grocery store. The SFM component 304 may overlap (or stitch together) image frames depicting the self-checkout lane (e.g., from multiple points-of-view) to reconstruct the planar scene comprising the self-checkout lane. For example, the SFM component 304 may identify (or detect) keypoints in each of the images and overlap (or stitch together) images based on those keypoints. In some examples, the SFM component 304 may generate (or construct) one or more templates of a planar scene (as described herein).

In some such examples, the SFM component 304 may comprise (or leverage) one or more of the keypoint matching model(s) 112, the detection matching model(s) 206, and/or the like as described herein. Using the keypoints as reference points to relate image frames from different points-of-view (and/or with different cameras), the SFM component 304 can estimate the position and/or orientation of one or more cameras (e.g., relative to the keypoints and/or other cameras). Based on the estimated position data and/or the estimated orientation data the SFM component 304 may use triangulation techniques (and/or the like) to generate 3D coordinates relative to the keypoints (and/or the cameras) and generate point cloud data representative of the estimated position data and/or the estimated orientation data. The SFM component 304 may refine (e.g., remove incorrection, redundant, and/or inconsistent data, such as described above in connection with FIGS. 1 and 2) the 3D model (e.g., 3D model data, etc.) representing, at least in part, the self-checkout lane at the grocery store. It should be appreciated that the refined 3D model may comprise a more detailed and/or accurate 3D representation of the planar scene. The SFM component 304 may generate localized image data 306 based on the estimated position data, the estimated orientation data, and/or any other data that may be determined from the 3D model (or refined 3D model).

The localized image data 306, as shown, may be any image data representative of still images (or pictures) and/or video. In some examples, the localized image data 306 may comprise, at least in part, the localized camera data 108 and/or the updated camera data 128 as described above in connection with FIG. 1. The localized image data 306 may comprise, at least in part, the estimated position data, the estimated orientation data, and/or any other data that the SFM component 304 may determine from the 3D model (and/or the refined 3D model). Additionally, or alternatively, the localized image data 306, as shown, may comprise any camera parameter data (e.g., extrinsic, intrinsic, etc.) for a calibrated and/or localized camera (e.g., electronic device 600, camera 120B, or the like) of a preexisting (or previously installed) camera system (and/or camera rig). In addition, the localized image data 306 may comprise, at least in part, the image data 302 as described above. In some examples, the localized image data 306 may be stored to a localized image database to facilitate searching (or querying) localized images (e.g., based on a query image, keypoints, and/or the like as described below).

The retriever model 308, as shown, may be one or more of any software (e.g., retrieval algorithm, artificial neural network, algorithm(s), etc.), firmware, and/or dedicated hardware (e.g., FPGA, ASIC, ASSP, SoC, CPLD, etc.), and/or the like as described herein for, at least in part, querying a database and retrieving data from the database. For example, the retriever model 308 may be configured to receive a query request based on an image frame, keypoints, and/or any other data associated with the query image data 310 (as described below). In some examples, the retriever model 308 may be configured to utilize one or more image retrieval techniques, such as Content-Based Image Retrieval (CBIR), Text-Based Image Retrieval (TBIR), Semantic-Based Image Retrieval (SBIR), and/or any other image based retrieval techniques. In some examples, the retriever model 308 may utilize metadata associated with one or more images. In such examples, the metadata may be stored with any associated image data and the metadata may indicate one or more of a keyword, a tag, and/or a description indicating one or more features of the image data (e.g., keypoints in the image frame, the camera that captured the image frame, a location, etc.).

The query image data 310, as shown, may be any image data representative of one or more still images (or pictures) and/or video. In some examples, the query image data 310 may comprise, at least in part, the unlocalized image data 104 as described above in connection with FIG. 1. In some examples, the query image data 310 may comprise, at least in part, the unlocalized image data 204 as described above in connection with FIG. 2. In some examples, the query image data 310 may comprise at least one image frame representative of a planar scene from at least one camera's point-of-view. In some examples, the query image data 310 may comprise metadata indicating one or more of a keyword, a tag, and/or a description indicating one or more features of the query image data 310 (e.g., keypoints in the image frame, the camera that captured the image frame, a location, etc.). In some examples, a user input may indicate the query image data 310 and additional metadata.

The localization component 312, as shown, may be one or more of any software (e.g., retrieval algorithm, artificial neural network, algorithm(s), etc.), firmware, and/or dedicated hardware (e.g., FPGA, ASIC, ASSP, SoC, CPLD, etc.), and/or the like as described herein for, at least in part, extracting information from the query image data 310 to facilitate retrieval of localized image data 306 that matches, at least in part, the query image data 310. For example, the localization component 312 may be configured to receive the query image data 310 and generate a query request based on one or more of an image frame, a keypoint, metadata, and/or any other data associated with the query image data 310. In some such examples, the localization component 312 may transmit, provide, or send the query request to the retriever model 308 to initiate retrieval of any or all of the localized image data 306 that may match the query image data 310. In some examples, the localization component 312 may be comprise, at least in part, the keypoint matching model(s) 112 as described in connection with FIG. 1. In some examples, the localization component 312 may be comprise, at least in part, the detection matching model(s) 206 as described in connection with FIG. 2. For example, the localization component 312 may identify and match keypoints of the query image data 310 with keypoints of the localized image data 306. Once the query image data 310 can be matched with (or identified using) any or all matching localized image data (e.g., found in the localized image data 306), then the localization component 312 may generate the localized query image data 314 (as described below).

The localized query image data 314, as shown, may be any image data representative of one or more still images (or pictures) and/or video. In some examples, the localized query image data 314 may comprise, at least in part, the query image data 310 as described above. In some examples, the localized query image data 314 may comprise, at least in part, the localized camera data 108 and/or the updated camera data 128 as described above in connection with FIG. 1. In some examples, the localized query image data 314 may comprise at least one image frame representative of a planar scene from at least one camera's point-of-view. In addition, the localized query image data 314 may comprise one or more camera parameters, such as a position and/or an orientation of the camera and/or the at least one camera's point-of-view (e.g., the camera's image frame). In some examples, the localized query image data 314 may comprise metadata indicating one or more of a keyword, a tag, and/or a description indicating one or more features (e.g., identified by the localization component 312 and/or the retriever model 308). In some examples, the localized query image data 314 and/or any or all associated metadata may be provided to a user via a user interface. For example, a user interface may render a position and/or an orientation of the camera, such as coordinate and/or angle values. In some examples, the user interface may render a position and/or an orientation of the camera in a 3D model of the planar space (e.g., generated using the SFM component 304 and/or the like as described herein).

Now that example systems for camera localization have been described above with reference to FIGS. 1-3, an example model of a planar scene captured by a plurality of cameras will now be described below with reference to FIG. 4.

Figure 4:
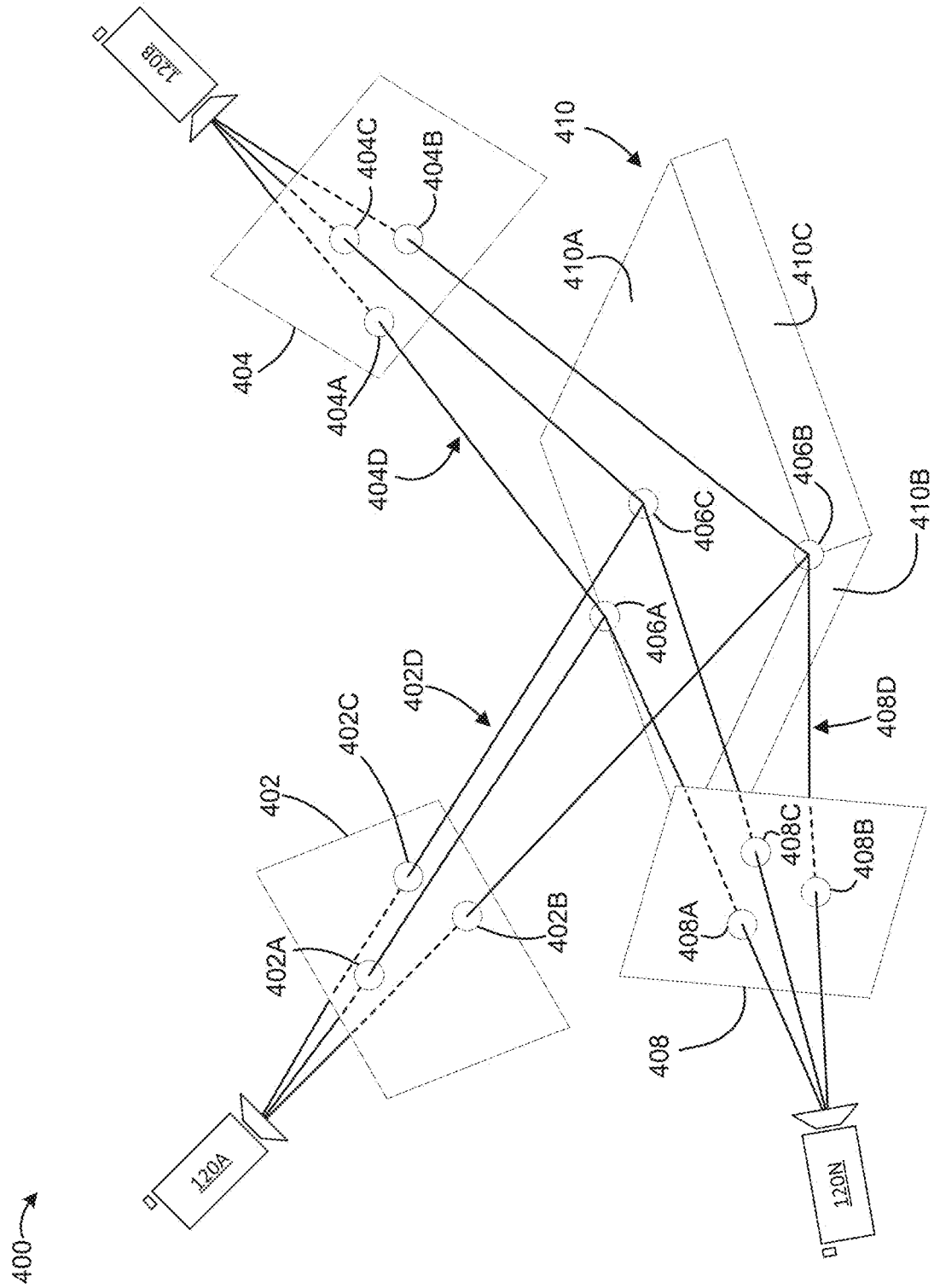
FIG. 4 illustrates an example model of a planar scene captured by a plurality of cameras, in accordance with various aspects of the present disclosure.

FIG. 4 illustrates an example model of a planar scene captured by a plurality of cameras, in accordance with various aspects of the present disclosure. As shown, the model 400 comprises a plurality of cameras (e.g., camera 120A, camera 120B, and camera 120N), a plurality of image frames (e.g., image frame 402, image frame 404, and image frame 408) and a planar scene 410. The model 400, as shown, illustrates, at least in part, an example 3D model (and/or an example homography) relating the planar scene 410 to each of the plurality of cameras and/or the plurality of image frames. In some examples, one or more systems (e.g., system 100, system 200, system 300, and/or the like) and/or one or more electronic devices (e.g., electronic device 600 and/or the like) may generate the model 400 to determine one or more camera parameters (e.g., using one or more operations described herein, such as in connection with the process 700 described below). For example, the system 100 (or the like) may generate one or more homographies representing the position and/or orientation of each of the plurality of cameras as shown in the model 400. Additionally, or alternatively, the system 200 (or the like) may generate the model 400 and/or construct a pose-graph from the model 400.

In the depicted example(s) of FIG. 4, each of the cameras (e.g., camera 120A, camera 120B, and camera 120N) is shown with a respective line of sight to each of the keypoints (e.g., keypoint 406A, keypoint 406B, and keypoint 406C). It will be understood that if one camera (e.g., camera 120B, etc.) does not have a clear line of sight to a particular keypoint (e.g., keypoint 406B, etc.) then an unlocalized camera (e.g., camera 120A, etc.) may still be localized based, at least in part, on image data from one or more other cameras (e.g., camera 120N, etc.) having a respective line of sight to the particular keypoint (e.g., keypoint 406B, etc.). Additionally, or alternatively, if one camera (e.g., camera 120B, etc.) does not have a clear line of sight to a particular keypoint (e.g., keypoint 406B, etc.) then an unlocalized camera (e.g., camera 120A, etc.) may still be localized based, at least in part, on a template (e.g., and/or template data) representative of the planar scene (e.g., planar scene 410, etc.). To this end, it should be understood that in some examples, one or more keypoints (e.g., keypoint 404B and/or the like as described herein) of one or more image frames (e.g., image frame 404 and/or the like described herein) may be omitted (e.g., from one or more methods, processes, and/or operations as described herein).

The plurality of cameras, as shown, may be any two or more cameras for capturing (or generating) image data comprising one or more of an image frame, an image plane, a picture, a video, and/or the like. As shown, the plurality of cameras comprises the camera 120A, the camera 120B, and the camera 120N. In some examples, the camera 120N may represent one or more cameras at various distinct positions and/or orientations around the planar scene 410. In some examples, the camera 120N may be, at least in part, omitted from the model 400.

In some examples, the plurality of cameras may comprise a plurality of uncalibrated and/or unlocalized cameras, such as a multi-camera system being setup (or installed) at a location (e.g., sports venue, retail location, etc.). In some such examples, the camera 120A and/or one or more additional cameras (e.g., represented by the camera 120N) may be any unlocalized and/or uncalibrated camera as described herein. In addition, the camera 120B and/or one or more additional cameras (e.g., represented by the camera 120N) may be any localized and/or calibrated mobile cameras (as described herein) configured to generate scene scan data (e.g., scene scan data 106 and/or the like) at various distinct perspectives (or points-of-view) around the planar scene 410.

In some examples, the plurality of cameras may comprise a plurality of preexisting (or preinstalled) cameras, such as a multi-camera system already localized and/or calibrated relative to a location (e.g., sports venue, retail location, etc.). In some such examples, the camera 120A and/or one or more additional cameras (e.g., represented by the camera 120N) may be any unlocalized and/or uncalibrated camera (as described herein) that are being incorporated into the preexisting (or preinstalled) multi-camera system. In addition, the camera 120B and/or one or more additional cameras (e.g., represented by the camera 120N) may be any preexisting (or preinstalled) localized and/or calibrated cameras (as described herein) of the preexisting (or preinstalled) multi-camera system (e.g., security system, etc.). Further, the camera 120B and/or the one or more additional cameras may be configured to generate localized camera data (e.g., localized camera data 108, localized image data 306, and/or the like) from various distinct perspectives (or points-of-view) around the planar scene 410.

The plurality of image frames, as shown, may be any two or more image frames representing a planar scene from respective perspectives (or points-of-view). As shown, the plurality of image frames comprises the image frame 402, the image frame 404, and the image frame 408. In some examples, each image frame may comprise (or define) a resolution (e.g., 1080p, etc.) and/or a plurality of pixels (e.g., 1920×1080, etc.). In some examples, one or more pixels (e.g., 3, 5, 12, or any other number of pixels) of the plurality of pixels may represent a respective keypoint of a planar scene (e.g., planar scene 410). In some examples, an image frame (e.g., image frame 402, image frame 404, image frame 408, and/or the like) may comprise an image plane (e.g., image plane 505 as described below in connection with FIG. 5) representative of a plane (e.g., table/counter top, wall, floor, field, etc.) of a planar scene (e.g., planar scene 410) as viewed, at least in part, from a perspective (or point-of-view) of a respective camera. In some examples, a camera may generate image data (e.g., video, etc.) comprising a plurality of image frames from the same (or a similar) perspective (or point-of-view) of the camera.

The image frame 402, as shown, may be any image frame generated by the camera 120A. The image frame 402 may be representative of a perspective (or point-of-view) of the planar scene 410 as viewed from a position and/or an orientation of the camera 120A. As shown, the image frame 402 comprises a keypoint 402A, a keypoint 402B, and a keypoint 402C. The keypoint 402A may comprise (or define) at least one pixel representing the keypoint 406A of the planar scene 410. In the depicted example, the keypoint 402A is mapped to the keypoint 406A of the planar scene 410 (and/or any other keypoints mapped thereto), at least in part, by at least one of the transform lines 402D (e.g., representing one or more homographic transformations between the image frame 402 and the planar scene 410). The keypoint 402B may comprise (or define) at least one pixel representing the keypoint 406B of the planar scene 410. In the depicted example, the keypoint 402B is mapped to the keypoint 406B of the planar scene 410 (and/or any other keypoints mapped thereto), at least in part, by at least one of the transform lines 402D. The keypoint 402C may comprise (or define) at least one pixel representing the keypoint 406C of the planar scene 410. In the depicted example, the keypoint 402C is mapped to the keypoint 406C of the planar scene 410 (and/or any other keypoints mapped thereto), at least in part, by at least one of the transform lines 402D. In some examples, the image frame 402 may comprise one or more additional keypoints similar to keypoint 402A, keypoint 402B, and/or keypoint 402C.

The image frame 404, as shown, may be any image frame generated by the camera 120B. The image frame 404 may be representative of a perspective (or point-of-view) of the planar scene 410 as viewed from a position and/or an orientation of the camera 120B. As shown, the image frame 404 comprises a keypoint 404A, a keypoint 404B, and a keypoint 404C. The keypoint 404A may comprise (or define) at least one pixel representing the keypoint 406A of the planar scene 410. In the depicted example, the keypoint 404A is mapped to the keypoint 406A of the planar scene 410 (and/or any other keypoints mapped thereto), at least in part, by at least one of the transform lines 404D (e.g., representing one or more homographic transformations between the image frame 404 and the planar scene 410). The keypoint 404B may comprise (or define) at least one pixel representing the keypoint 406B of the planar scene 410. In the depicted example, the keypoint 404B is mapped to the keypoint 406B of the planar scene 410 (and/or any other keypoints mapped thereto), at least in part, by at least one of the transform lines 404D. The keypoint 404C may comprise (or define) at least one pixel representing the keypoint 406C of the planar scene 410. In the depicted example, the keypoint 404C is mapped to the keypoint 406C of the planar scene 410 (and/or any other keypoints mapped thereto), at least in part, by at least one of the transform lines 404D. In some examples, the image frame 404 may comprise one or more additional keypoints similar to keypoint 404A, keypoint 404B, and/or keypoint 404C.

The image frame 408, as shown, may be any one or more image frames generated by one or more respective additional cameras (e.g., represented by the camera 120N). The image frame 408 may be representative of one or more perspectives (or points-of-view) of the planar scene 410 as viewed from one or more positions and/or one or more orientations of one or more additional cameras (e.g., represented by the camera 120N). As shown, the image frame 408 comprises a keypoint 408A, a keypoint 408B, and a keypoint 408C. The keypoint 408A may comprise (or define) at least one pixel representing the keypoint 406A of the planar scene 410. In the depicted example, the keypoint 408A is mapped to the keypoint 406A of the planar scene 410 (and/or any other keypoints mapped thereto), at least in part, by at least one of the transform lines 408D (e.g., representing one or more homographic transformations between the image frame 408 and the planar scene 410). The keypoint 408B may comprise (or define) at least one pixel representing the keypoint 406B of the planar scene 410. In the depicted example, the keypoint 408B is mapped to the keypoint 406B of the planar scene 410 (and/or any other keypoints mapped thereto), at least in part, by at least one of the transform lines 408D. The keypoint 408C may comprise (or define) at least one pixel representing the keypoint 406C of the planar scene 410. In the depicted example, the keypoint 408C is mapped to the keypoint 406C of the planar scene 410 (and/or any other keypoints mapped thereto), at least in part, by at least one of the transform lines 408D. In some examples, the image frame 408 may comprise one or more additional keypoints similar to keypoint 408A, keypoint 408B, and/or keypoint 408C.

The planar scene 410, as shown, may be any planar scene as described herein. In the depicted example, the planar scene 410 comprises a planar surface 410A, a planar surface 410B, and a planar surface 410C. Each of the planar surfaces (e.g., planar surface 410A, planar surface 410B, and planar surface 410C) may comprise (or represent) any planar surface as described herein. For example, the planar surface 410A may comprise any (e.g., horizontal, sloped, inclined, etc.) plane and/or planar surface (described herein), such as a floor (e.g., a tile floor of a store, a wooden basketball court, a grass field, etc.), a furniture surface (e.g., table top, shelf, counter top, etc.), a staircase (e.g., top surface of a step, etc.), and/or the like. Additionally, or alternatively, the planar surface 410B and/or the planar surface 410C may comprise any (e.g., vertical, sloped, inclined, etc.) plane and/or planar surface (described herein), such as a wall (e.g., a cement or brick wall of a store or sports venue, a window, etc.), a furniture (or fixture) surface (e.g., side of a shelf, box, bleachers, etc.), a staircase (e.g., a stair riser, a stringer, etc.), and/or the like. In some examples, the planar scene 410 may comprise, at least in part, one or more objects comprising one or more planar surfaces. For example, the planar scene 410 may comprise a box (e.g., cardboard box, crate, etc.), a building (e.g., exterior of a warehouse, etc.), a jewelry case or glass kiosk in a store, a baseball plate (e.g., home plate on a baseball field), and/or any other objects, furniture, and/or fixtures as described herein.

It will be understood that the planar scene 410 may comprise (or represent) any example plane(s), planar surface(s), and/or 3D object(s). Accordingly, the planar scene 410 should not be interpreted as comprising (or representing) only the 3D shape illustrated in FIG. 4 unless specifically stated otherwise for a given example or otherwise understood within the context of a given example. For instance, the planar scene 410 should not be interpreted to comprise (or represent) only a single rectangular prism, such as shown, unless specifically stated otherwise, or otherwise understood within the context of a given example.

In the depicted example, the planar scene 410 comprises a keypoint 406A, a keypoint 406B, and a keypoint 406C. The keypoint 406A may comprise (or represent) any feature of a planar scene as described herein. For example, the keypoint 406A, as shown, may comprise (or represent) an edge of an object (e.g., the edge of a table or a counter surface, and/or the like). The keypoint 406A may comprise (or define) at least one recognizable (or identifiable) point (or datapoint) representing a feature of the planar scene 410. In the depicted example, the keypoint 406A is mapped to: the image frame 402, at least in part, by the transform lines 402D; the image frame 404, at least in part, by the transform lines 404D; and the image frame 408, at least in part, by the transform lines 408D.

The keypoint 406B may comprise (or represent) any feature of a planar scene as described herein. For example, the keypoint 406B, as shown, may comprise (or represent) a corner of an object (e.g., the corner of a wall (or floor) tile or a self-checkout counter, and/or the like). The keypoint 406B may comprise (or define) at least one recognizable (or identifiable) point (or datapoint) representing a feature of the planar scene 410. In the depicted example, the keypoint 406B is mapped to: the image frame 402, at least in part, by the transform lines 402D; the image frame 404, at least in part, by the transform lines 404D; and the image frame 408, at least in part, by the transform lines 408D.

The keypoint 406C may comprise (or represent) any feature of a planar scene as described herein. For example, the keypoint 406C, as shown, may comprise (or represent) a marking on an object (e.g., a sticker on a wall (or the floor), paint (or tape) markings on a basketball court, the center of a baseball plate, and/or the like). In some examples, the keypoint 406C may comprise (or represent) damage to, or a defect of, an object. For example, the keypoint 406C may comprise one or more of a scratch, a crack, a dent, and/or the like. The keypoint 406C may comprise (or define) at least one recognizable (or identifiable) point (or datapoint) representing a feature of the planar scene 410. In the depicted example, the keypoint 406C is mapped to: the image frame 402, at least in part, by the transform lines 402D; the image frame 404, at least in part, by the transform lines 404D; and the image frame 408, at least in part, by the transform lines 408D.

In some examples, the planar scene 410 may comprise one or more additional keypoints similar to keypoint 406A, keypoint 406B, and/or keypoint 406C. For example, the keypoint matching model(s) 112 (and/or the like) may detect a keypoint comprising (or representing) an edge along the planar surface 410B. Additionally, or alternatively, the detection matching model(s) 206 (and/or the like) may detect a keypoint comprising (or representing) another corner (e.g., different from the keypoint 406B) along the planar surface 410A. Additionally, or alternatively, the SFM component 304 (and/or the like) may detect a keypoint comprising (or representing) an image (e.g., picture, poster, sticker, painting, symbol etc.) on the planar surface 410B and/or the planar surface 410C.

Now that an example model of a planar scene captured by a plurality of cameras has been described above with reference to FIG. 4, an example homography will now be described below with reference to FIG. 5.

Figure 5:
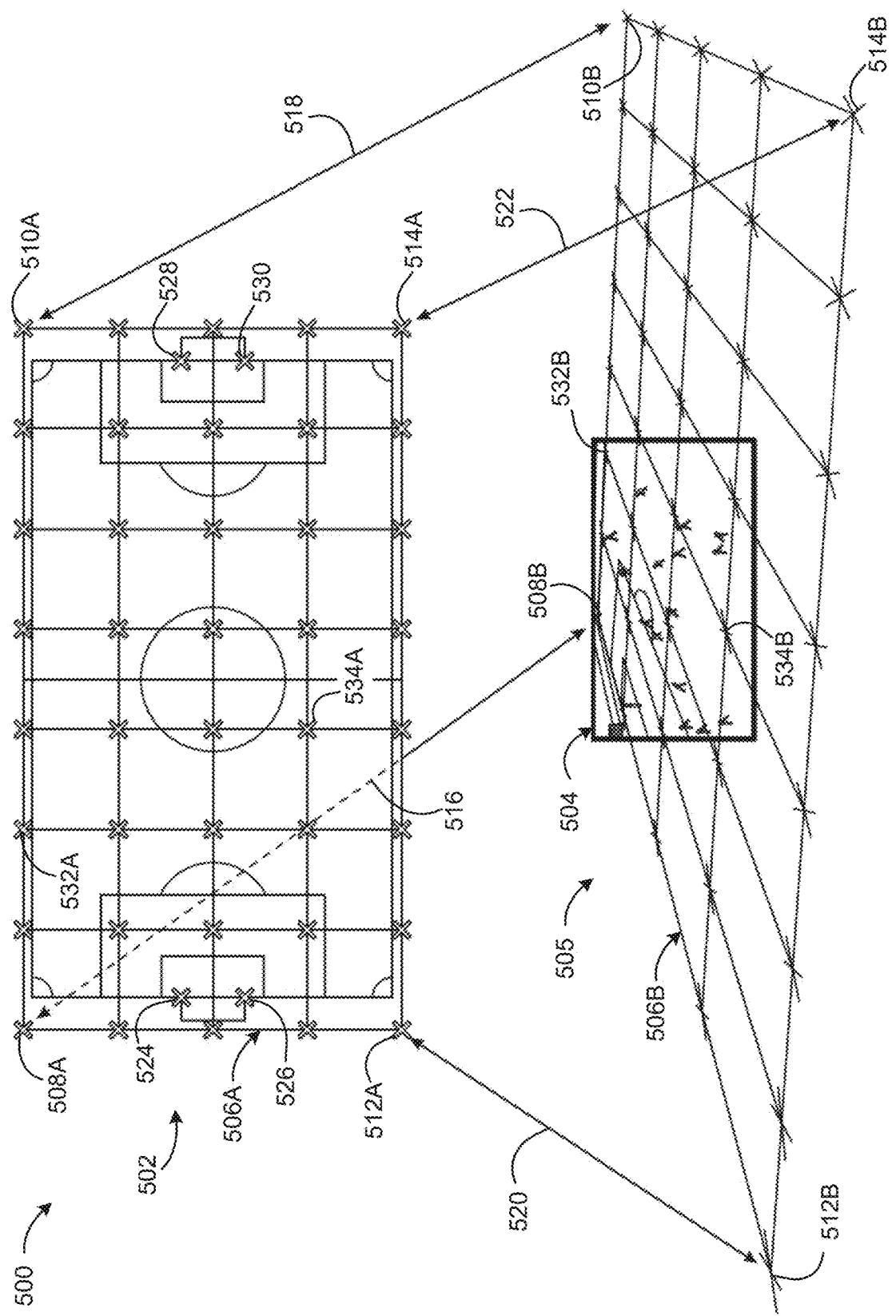
FIG. 5 illustrates an example homography, in accordance with various aspects of the present disclosure.

FIG. 5 illustrates an example homography, in accordance with various aspects of the present disclosure. As shown, homography 500 is a projective transformation (e.g., a homographic transformation) between two or more planes that maps the two or more planes based on a plurality of common (and/or shared) points (e.g., keypoints, datapoints, etc.). Homography 500, as shown, comprises a planar coordinate system 502 mapped to an image plane 505 of an image frame 504. In some examples, as depicted in FIG. 5, the planar coordinate system 502 may be overlayed on a soccer field. In other examples, the planar coordinate system 502 may be overlayed on any planar surface described herein, such as a basketball court, a retail counter, a wall, and/or the like. In some examples, a homography matrix (e.g., homography 500 or the like described herein) may be applied between any planar surface (e.g., of a sports venue, retail location, etc.) and any image plane of any image data (e.g., an image frame, a still picture, a video, etc.) that share common keypoints (e.g., identifiable features, coordinates, etc.).

Figure 6:
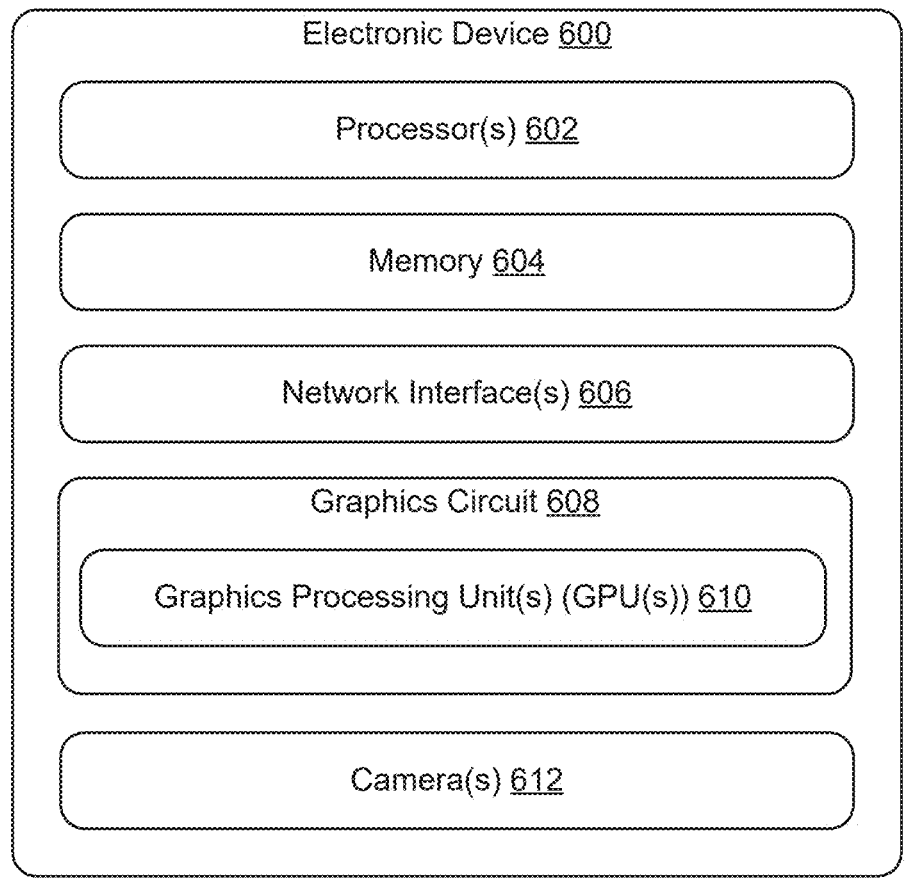
FIG. 6 illustrates a block diagram for an example electronic device, in accordance with various aspects of the present disclosure.

The planar coordinate system 502, as shown, may be any coordinate system (e.g., X-Y coordinates, RFID receiver locations, GPS coordinates, etc.) and/or series of keypoints (e.g., recognizable features or points in a planar scene). In some examples, the electronic device 600 (as shown in FIG. 6 and described in further detail below) may be configured to generate (or define) one or more points (e.g., keypoints, datapoints, etc.) of the planar coordinate system 502 for a sports venue (e.g., soccer field, basketball court, etc.). For example, the electronic device 600 may generate a plurality of GPS coordinate points (e.g., the plurality of points each represented in FIG. 5 with an "X") at fixed intervals across a court, field, rink, and/or the like as described herein.

In some examples, the electronic device 600 may generate (or define) points (e.g., keypoints, datapoints, coordinates, etc.) for specific (e.g., identifiable, recognizable, etc.) features on a planar surface (e.g., of a sports venue, of a retail location, etc.). For example, the electronic device 600 may generate scene scan data (e.g., scene scan data 106) by scanning a scene at a location (e.g., sport venue, retail store, etc.) with a camera (e.g., camera 120A, camera(s) 612, and/or the like) and detect one or more keypoints in the scene (e.g., using a video detection algorithm and/or another model as described herein). In some such examples, the electronic device 600 may comprise a calibrated and/or localized camera configured with known (or measurable) intrinsic camera parameters (e.g., focal length, principal point, lens distortion coefficients, etc.) and/or known (or measurable) extrinsic camera parameters (e.g., orientation, pan angle, tilt angle, translation vector relative to one or more keypoints in the scene, location coordinates, etc.). In some examples, the intrinsic camera parameters and/or the extrinsic camera parameters may be known (or measurable) to within ±1% (or any other number) of a measurable value. For example, a known (or measurable) pan angle of a camera may be known to be 45° with a margin of error of ±0.45° (or any other number).

As shown, planar coordinate system 502 comprises a plurality of points or keypoints (each represented in FIG. 5 with an "X") comprising the point 508A, point 510A, point 512A, point 514A, point 524, point 526, point 528, point 530, point 532A, and point 534A. As shown, point 508A, point 510A, point 512A, point 514A are each located at a respective corner of planar coordinate system 502. Additionally, point 524, point 526, point 528, and point 530 are each located at positions representing the location of one or more recognizable features on the soccer field (e.g., the sides of one or more soccer goals in the depicted example). In some examples, the electronic device 600 (shown in FIG. 6) may utilize one or more of point 524, point 526, point 528, point 530, and/or the like in conjunction with one or more of the intrinsic camera parameters and/or the extrinsic camera parameters to determine a location of one or more cameras and/or one or more image planes relative to a planar scene and/or a planar surface. For example, the electronic device 600 may utilize one or more keypoints (e.g., point 524 and/or the like) and/or triangulation techniques (e.g., angle-based triangulation, trilateration, and/or the like) to determine a location of a camera (e.g., by calculating a translation vector) relative to the one or more keypoints in a planar scene and/or on a planar surface. Additionally, or alternatively, planar coordinate system 502 may comprise a plurality of gridlines (e.g., gridline 506A) connecting one or more points in the coordinate system. In some examples, the electronic device 600 may generate one or more templates comprising the plurality of gridlines (e.g., gridline 506A) and the plurality of points (e.g., keypoints, point 508A, point 534A, point 526, etc.). In addition, the electronic device 600 may use the one or more templates to map the homography to one or more of a planar surface, a planar scene, an image plane, an image frame, and/or the like as described herein. In some examples, one or more templates (as described herein) may be representative of a location. In some such examples, the one or more templates may be used in place of (or in conjunction with) localized image data (such as described herein) for localizing an unlocalized camera and/or calibrating an uncalibrated camera.

The image frame 504, as shown, comprises a scene (or planar scene) of a soccer match on a soccer field (i.e., a planar surface). In addition, image frame 504 comprises (or defines) an image plane 505 which represents the soccer field from the point-of-view (e.g., perspective, viewing angle, etc.) of a camera (e.g., camera 120A, camera 120B, electronic device 600, etc.) capturing the video. In the depicted example, image frame 504 comprises point 508B, point 532B, and point 534B which correspond to point 508A, point 532A, and point 534A respectively in planar coordinate system 502. In some examples, the system 100 (and/or the like) may detect shared (or common) keypoints between an image frame (e.g., image frame 504 or the like) and a planar coordinate system (e.g., planar coordinate system 502 or the like) to map the planar coordinate system to an image plane of the image frame. In some examples, the keypoints (e.g., point 508B, point 532B, and point 534B) of an image frame (e.g., image frame 504) may be pixels of the image frame that represent (e.g., a center point of) a recognizable (or identifiable) feature and/or object of a planar scene and/or a planar surface. In the depicted example, the electronic device 600 may identify (or detect) (e.g., using object recognition algorithms, video detection algorithms and/or other models described herein) point 508B, point 532B, point 534B, and/or any other points (e.g., keypoints, features, etc.) shown in the image frame 504 to match the image frame 504 to the planar coordinate system 502.

Additionally, or alternatively, the electronic device 600 may map (or align) the points of planar coordinate system 502 with the points of image frame 504. For example, the electronic device 600 may manipulate (e.g., stretch, rotate, compress, translate, etc.) planar coordinate system 502 to align it with the image frame 504. For example, as shown, point 508A is translated (and/or rotated) along mapping line 516 to align with point 508B in image frame 504. It should be understood that point 532A and point 534A are similarly translated (and/or rotated) along their respective mapping lines (not shown). Further, it should be understood that a plurality of points between the planar coordinate system 502 and the image frame 504 may be aligned (or mapped) to ensure that planar coordinate system 502 is overlaid on image frame 504 in the correct proportions. As shown, points outside of image frame 504 may be aligned relative to the points within image frame 504 to generate a full mapping (and/or homographic transformation) between planar coordinate system 502 and image frame 504. In the illustrated example, point 510A is translated along mapping line 518 to point 510B, point 512A is translated along mapping line 520 to point 512B, and point 514A is translated along mapping line 522 to point 514B. It should be understood that this process may be performed for any or all points of planar coordinate system 502. Additionally, or alternatively, a plurality of gridlines (e.g., gridline 506A) of the planar coordinate system 502 may be translated to the image plane 505. For example, as shown, gridline 506A of the planar coordinate system 502 may be translated to the gridline 506B in the image plane 505. In some examples, the electronic device 600 may use one or more homography lines (e.g., comprising two or more keypoints) comprising a plurality of points (or keypoints) to map a planar surface (e.g., field, floor, wall, etc.) to one or more image planes (e.g., of one or more image frames).

Now that an example homography has been described above with reference to FIG. 5, a block diagram for an example electronic device will now be described below with reference to FIG. 6.

FIG. 6 illustrates a block diagram for an example electronic device, in accordance with various aspects of the present disclosure. The electronic device 600, as shown, comprises the processor(s) 602, memory 604, network interface(s) 606, graphics circuit 608, and camera(s) 612. The graphics circuit 608 (e.g., graphics chip, SoC, integrated circuit, graphics card, etc.), as shown, may comprise at least one Graphics Processing Unit (GPU), such as GPU(s) 610. In some examples, the graphics circuit 608 may further comprise dedicated memory and/or may leverage the memory 604. In some examples, the GPU(s) 610 (and/or the like) may comprise one or more features and/or aspects (e.g., multiple processors, multiple cores, cores of different types, etc.) described herein for the processor(s) 602. For example, the graphics circuit 608 may have a dedicated processor (e.g., GPU(s) 610) and/or may further leverage the processor(s) 602 (e.g., CPU(s)). The processor(s) 602 may perform various functions associated with controlling an operation of the electronic device 600, and the memory 604 may store instructions executable by the processor(s) 602 to perform the operations described herein.

As used herein, a processor or CPU, such as the processor(s) 602, may include multiple processors and/or a processor having multiple cores. Further, the processor(s) 602 may comprise one or more cores of different types. For example, the processor(s) 602 may include application processor units, graphic processing units, and so forth. In one implementation, the processor(s) 602 may comprise a microcontroller and/or a microprocessor. The processor(s) 602 may include a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System on a Chip (SoC), Complex Programmable Logic Devices (CPLDs), and/or the like. Additionally, each of the processor(s) 602 may possess its own local memory, which also may store at least one of program components, program data, program code, program instructions, firmware, software, Operating Systems (OS), and/or the like.

Memory, such as the memory 604, may include volatile and nonvolatile memory, removable and non-removable media implemented in any method or technology for storage of information, such as computer-readable instructions, data structures, program component, firmware, software, and/or any other data. The memory 604 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 604 may be implemented as Computer-Readable Storage Media (CRSM), which may comprise any available physical media accessible by the processor(s) 602 to execute instructions stored on the memory. In some examples, a CRSM may include random access memory (RAM) and flash memory (e.g., NAND flash, NOR flash, etc.). In other implementations, CRSM may include, but is not limited to, Read-Only Memory (ROM), Electrically Erasable Programmable Read-Only Memory (EEPROM), or any other tangible medium which can be used to store the desired information, and which can be accessed by the processor(s). The memory 604 are examples of non-transitory computer-readable media. The memory 604 may store an Operating System (OS) and one or more software applications, instructions, programs, and/or data to implement the methods described herein and the functions attributed to the various systems. For example, the memory 604 may comprise one or more databases, data tables, datasets, and/or the like as described herein.

Network interface(s) 606 permit the electronic device 600 to communicate over one or more networks. For example, the network interface(s) 606 may permit the electronic device 600 to communicate over one or more communications networks (e.g., the Internet, an intranet, a mobile network, and/or the like). In some examples, a communications network may comprise one or more communications channels, tunnels, Virtual Private Networks (VPNs), and/or the like. In some examples, a communications network may be implemented using encryption techniques (e.g., end to end encryption, etc.). Example network interface(s) 606 include, without limitation, a Wi-Fi circuit (e.g., Dual-band 802.11 a/b/g/n/ac/ax 2×2 MIMO dual-antenna, Tri-band 802.11 a/b/g/n/ac/ax 2×2 MIMO dual-antenna, etc.), ZigBee circuit, Bluetooth circuit (e.g., Bluetooth 5.2, Bluetooth Low Energy (BLE), etc.), LTE circuit, and/or any other communications protocol, hardware, software, and/or firmware. The network interface(s) 606 permit communication with remote device(s), such as mobile devices (e.g., phones, remote controls, microphones, etc.), systems (e.g., cloud services, remote servers, etc.), and/or the like. The network(s) may be representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

In some instances, inbound data may be routed through the network interface(s) 606 before being directed to the processor(s) 602 and/or GPU(s) 610, and outbound data from the processor(s) 602 and/or GPU(s) 610 may be routed through the network interface(s) 606. The network interface(s) 606 may therefore receive inputs, such as data, from the processor(s) 602, the GPU(s) 610, and/or any other component described herein. For example, the network interface(s) 606 may be configured to transmit data to and/or receive data from one or more network devices (e.g., Wi-Fi routers, etc.). The network interface(s) 606 may act as a conduit for data communicated between various components and the processor(s) 602 and/or the like.

The camera(s) 612 may be any camera for capturing image data and/or video data. For example, the camera(s) 612 may include various types of imaging sensors, such as Complementary Metal-Oxide-Semiconductor (CMOS) and/or Charge-Coupled Device (CCD) sensors, to capture highresolution photos and videos. Example cameras may include, without limitation, single-lens cameras, dual-lens cameras, multi-lens cameras and/or the like. In some examples, the camera(s) 612 may support various features, such as optical zoom, digital zoom, image stabilization, autofocus, and/or the like. The image data and/or video data may be stored locally (e.g., on memory 604) and/or remotely (e.g., on a remote server, with a cloud service, etc.).

Although certain components of the electronic device 600 are illustrated, it is to be understood that the electronic device 600 may include additional and/or alternative components. For example, the electronic device 600 may include other input/output devices (e.g., display, screen, light emitting diode (LED), etc.), heat dissipating elements (e.g., heatsinks, fans, vents, etc.), computing components (e.g., Printed Circuit Boards (PCBs), and/or the like. In some examples, one or more components illustrated for the electronic device 600 may be removed or omitted. In some examples, one or more components descried herein may be added to or incorporated with electronic device 600. For example, the electronic device 600 may comprise a Near Field Communication (NFC) circuit (e.g., NFC transmitter/receiver, etc.) and/or a Global Position System (GPS) circuit (e.g., GPS transmitter/receiver, etc.). Examples of the electronic device 600 may include, without limitation, a server, desktop computer, laptop computer, smartphone, and/or the like as described herein.

Now that a block diagram for an example electronic device has been described above with reference to FIG. 6, an example flowchart for camera localization will now be described below with reference to FIG. 7.

Figure 7:
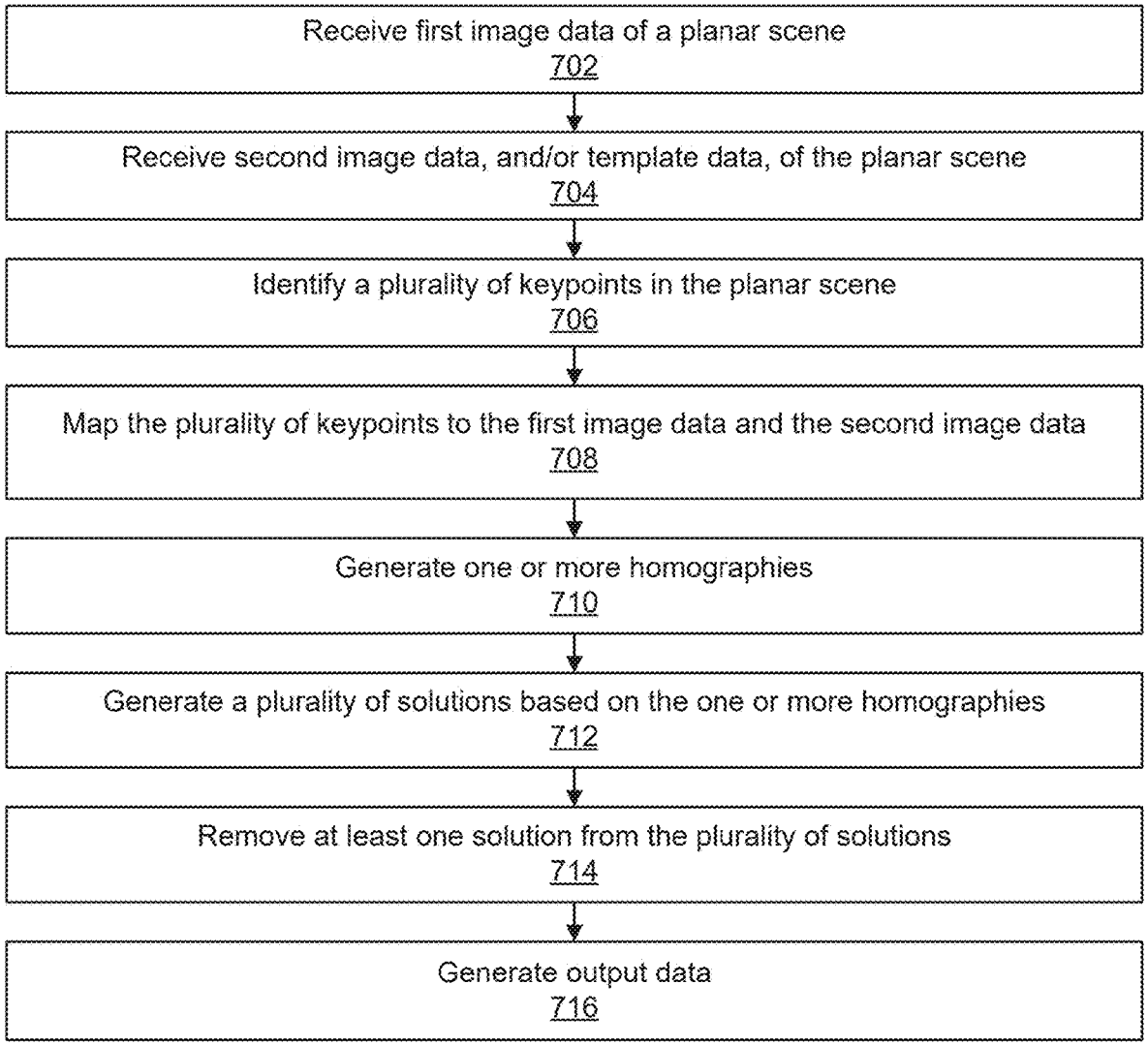
FIG. 7 illustrates an example flowchart for camera localization, in accordance with various aspects of the present disclosure.

FIG. 7 illustrates an example flowchart for camera localization, in accordance with various aspects of the present disclosure. As shown, the process 700 may be used for localizing a camera (e.g., of a multi-camera system). The operations of the process 700 may represent a series of instructions comprising computer readable machine code executable by a processing unit (e.g., processor(s) 602) of one or more computing devices described herein (e.g., electronic device 600, server(s), etc.), although various operations may also be implemented in, or using, hardware (e.g., camera 120A, camera 120B, ASICs, SoCs, etc.). In some examples, the computer readable machine codes may be comprised of instructions selected from a native instruction set of at least one processor and/or an operating system of the electronic device 600. In some examples, the process 700 may be performed, at least in part, by one or more components of electronic device 600. For example, the process 700 may be performed by an electronic device (e.g., electronic device 600) comprising at least one processor (e.g., processor(s) 602) and at least one computer readable media (e.g., memory 604) storing processor executable instructions which, when executed using the at least one processor, causes the electronic device to perform, at least in part, one or more of operations 702-716, and/or the like, as described herein. In some examples, the process 700 may comprise one or more operations, techniques, and/or features as described above in connection with at least FIGS. 1-5.

As shown in FIG. 7, the process 700 may begin at operation 702, at which the electronic device 600 (or the like as described herein) may receive first image data of a planar scene. For example, the electronic device 600 may receive image data captured by an unlocalized and/or uncalibrated camera to be installed with a multi-camera system at any location as described herein. In some examples, the operation 702 may comprise generating first image data representing a planar scene. In some such examples, the first image data may comprise a first image plane representing the first point-of-view of a first camera (e.g., an unlocalized and/or uncalibrated camera, camera 120A, camera 120N, or the like). For example, the first camera may be located at a first point-of-view at a location (e.g., a retail store, arena, etc.) and/or the first camera may be uncalibrated and/or unlocalized. In some examples, the operation 702 may comprise generating (e.g., using a first camera) first image data comprising the first image plane representing the planar scene from a first point-of-view (e.g., a first perspective of the first camera and/or a first image frame). In some such examples, the first camera is an unlocalized camera. In some examples, the first image data may comprise the unlocalized image data 104 as described above in connection with FIG. 1. In some examples, the first image data may comprise one or more of an image frame, an image plane, a planar scene, and/or the like as described herein. In some examples, the operation 702 may comprise receiving, from the first camera (e.g., via a network interface, a communications network, and/or the like), the first image data.

The process 700 may continue at operation 704, at which the electronic device 600 (or the like as described herein) may receive second image data, and/or template data, of the planar scene. For example, the electronic device 600 may receive image data captured by a localized and/or calibrated camera that is (i) already installed within a multi-camera system at any location as described herein, and/or (ii) a mobile camera for generating scene scan data. In some examples, the electronic device 600 may receive, from a database, (e.g., three-dimensional (3D), etc.) template data (e.g., a 3D model of a sports venue, a retail store, etc.) comprising second image data representing the planar scene. In some examples, template data may comprise image data (e.g., one or more images, virtual images, computer-aided drawings, and/or the like) captured by a localized and/or calibrated camera that is (i) already installed within a multi-camera system at any location as described herein, and/or (ii) a mobile camera for generating scene scan data. For example, an electronic device may generate a 3D model of a location based on localized image data (or the like) representing the location. In some examples, an electronic device may generate a 3D model of a location based on one or more of localized or unlocalized image data, GPS data, measurement data (e.g., from a 3D scanner, etc.), and/or any other modeling data as described herein. In some examples, the operation 704 may comprise generating second image data representing a planar scene (e.g., the same planar scene of the first image data). In some such examples, the second image data comprises a second image plane representing a second point-of-view (e.g., a second perspective of the second camera and/or a second image frame). In some such examples, the second image data may comprise a second image plane representing the second point-of-view of a second camera (e.g., a localized and/or calibrated camera, camera 120B, camera 120N, or the like). For example, the second camera may be located at a second point-of-view at a location (e.g., a retail store, arena, etc.) and/or the second camera may be calibrated and/or localized. In some examples, the operation 704 may comprise generating (e.g., using a second camera) second image data comprising the second image plane representing the planar scene from a second point-of-view.

In some examples, the operation 704 may comprise generating (e.g., using the second camera, such as a mobile camera or the like), scene scan data comprising a plurality of image planes representing the planar scene from a plurality of points-of-view. In some examples, the scene scan data comprises at least one of a calibration parameter or a localization parameter associated with the plurality of image planes. In some examples, the second camera comprises a mobile camera (e.g., one or more of a smart phone, a handheld camera, a drone camera, or any camera on a moveable camera rig). In some examples, the operation 704 may comprise receiving, from the second camera (e.g., via a network interface, a communications network, and/or the like), the second image data.

In some examples, the operation 704 may comprise generating (e.g., using the second camera, such as a preexisting and/or previously installed camera of a multi-camera system), localized camera data comprising a plurality of image planes representing the planar scene from a plurality of points-of-view. In some examples, the localized camera data comprises at least one of a calibration parameter or a localization parameter associated with the plurality of image planes. In some examples, the second camera comprises a plurality of localized cameras. In some examples, the second image data may comprise the scene scan data 106 and/or the localized camera data 108 as described above in connection with FIG. 1. In some examples, the second image data may comprise one or more of an image frame, an image plane, a planar scene, and/or the like as described herein.

The process 700 may continue at operation 706, at which the electronic device 600 (or the like as described herein) may identify a plurality of keypoints in the planar scene. For example, a keypoint matching model (e.g., keypoint matching model(s) 112) and/or a detection matching model (e.g., detection matching model(s) 206) may use the first image data and/or the second image data as input data (e.g., input data 102, input data 202, or the like) to identify a keypoint (and/or the like as described herein) of the planar scene that is visible in the first image data and the second image data. In some examples, a keypoint (and/or the like as described herein) of the planar scene may be represented by, and/or identified with, a first pixel in a first image frame of the first image data. In some examples, a keypoint (and/or the like as described herein) of the planar scene may be represented by, and/or identified with, a second pixel in a second image frame of the second image data. In some examples, the operation 706 may comprise identifying a keypoint (and/or the like as described herein) of a planar scene that is visible in the first image data and the second image data.

The process 700 may continue at operation 708, at which the electronic device 600 (or the like as described herein) may map the plurality of keypoints to the first image data and the second image data. For example, a keypoint matching model (e.g., keypoint matching model(s) 112) and/or a detection matching model (e.g., detection matching model(s) 206) may identify a keypoint (and/or the like as described herein) of the planar scene with a first pixel of the first image data and a second pixel of the second image data. In addition, the one or more models (e.g., keypoint matching model(s) 112, detection matching model(s) 206, and/or the like as described herein) may generate a database (or data table) that associated a keypoint identifier (as described herein) with one or more pixel identifiers (as described herein) (e.g., a pixel identifier representative of any or all pixels associated with a respective keypoint in a respective image frame, such as a second pixel of second image frame of the second image data). In some examples, the operation 708 may comprise matching one or more keypoints (e.g., of the plurality of keypoints) of a planar scene to one or more first pixels of one or more of first image data, a first image plane, a first image frame, and/or the like as described herein. In some examples, the operation 708 may comprise matching one or more keypoints (e.g., of the plurality of keypoints) of a planar scene to one or more second pixels of one or more of second image data, a second image plane, a second image frame, and/or the like as described herein. It should be understood that image data may comprise one or more image frames representative of a planar scene and/or planar object/surface. In addition, an image frame may comprise an image plane (e.g., associated with one or more of a planar scene, planar object/surface, and/or a homography). In some examples, the operation 708 may comprise matching a keypoint of a planar scene to a first pixel of a first image plane and a second pixel of a second image plane.

The process 700 may continue at operation 710, at which the electronic device 600 (or the like as described herein) may generate one or more homographies. For example, the electronic device 600 (the system 100, the system 200, and/or the like) may utilize the one or more models (e.g., keypoint matching model(s) 112, detection matching model(s) 206, and/or the like) to generate homographics computation data (e.g., homographics computation data 110, homographies computation data 208, and/or the like). In some examples, the homographies computation data may comprise one or more of a homography (e.g., homography 500, etc.), homographic transformations, and/or the like as described herein). In some examples, the operation 710 may comprise generating a homography relating the planar scene, the first image plane, and the second image plane based on the keypoint, the first pixel, and the second pixel. In some examples, the operation 710 may comprise generating homographies comprising homographic transformations between the planar scene, the first image plane, and the second image plane (e.g., based on the keypoint, the first pixel, and the second pixel).

As shown in FIG. 7, in some examples, the operations 712-716 (described below) may comprise one or more solution pipelines for generating output data (e.g., output data 124, output data 222, and/or the like). For instance, in some examples, the operations 712-716 may comprise features and/or techniques described above in connection with one or more of the minimal solver 116, the suggested solutions data 118, the inaccuracy resolver 122, and/or the output data 124 (as shown in FIG. 1). Additionally, or alternatively, the operations 712-716 may comprise features and/or techniques described above in connection with one or more of the homography estimator 212, the pose-graph construction data 214, the pose-graph pruner 216, the pruned pose-graph construction data 218, the pose estimator 220, and/or the output data 222 (as shown in FIG. 2).

The process 700 may continue at operation 712, at which the electronic device 600 (or the like as described herein) may generate a plurality of solutions based on the one or more homographies. For example, the electronic device 600 may utilize the minimal solver 116 to generate the suggested solutions data 118 comprising a plurality of solutions (e.g., positions, orientations, camera parameters, and/or the like), such as shown in FIG. 1. In some examples, the operation 712 may comprise receiving (or accessing) (e.g., by the minimal solver 116 or the like) one or more first images (e.g., image frames, pictures, etc.) from the first image data. In some examples, the operation 712 may comprise receiving (or accessing) (e.g., by the minimal solver 116 or the like) one or more (e.g., 2, 3, 10, or any other number) images (e.g., image frames, pictures, etc.) from the second image data. In some examples, the operation 712 may comprise receiving (or accessing) (e.g., by the minimal solver 116 or the like), at least in part, one or more homographies. In some examples, the operation 712 may comprise generating a plurality of suggested solutions comprising at least one of a suggested calibration parameter or a suggested localization parameter for the first camera (and/or a first image plane of the first camera).

Additionally, or alternatively, the electronic device 600 may utilize the homography estimator 212 to generate the pose-graph construction data 214 comprising a plurality of solutions (e.g., positions, orientations, camera parameters, poses, homographic transformations, and/or the like), such as shown in FIG. 2. In some examples, the operation 712 may comprise receiving (or accessing) (e.g., by the homography estimator 212 or the like), at least in part, one or more homographies. In some examples, the homographics represent at least one planar surface of the planar scene. In some examples, the operation 712 may comprise generating, based on the homographic transformations, a pose-graph construction comprising a plurality of nodes connected by a plurality of edges. In some examples, a respective node of the plurality of nodes represents a pose comprising a position and an orientation for a respective camera. In some examples, a respective node of the plurality of nodes represents a pose that is associated with a first image plane of a first camera, a second image plane of a second camera, and/or the any other image plane. In some examples, a respective edge of the plurality of edges represents a respective homographic transformation between two nodes. In some examples, the operation 712 may comprise, at least in part, a solution pipeline.

The process 700 may continue at operation 714, at which the electronic device 600 (or the like as described herein) may remove at least one solution from the plurality of solutions. For example, the electronic device 600 may utilize the inaccuracy resolver 122 to generate (e.g., based on the plurality of suggested solutions) output data, such as shown in FIG. 1. In some examples, the operation 714 may comprise removing, from the plurality of suggested solutions (e.g., using the inaccuracy resolver 122 or the like), an incorrect solution. In some examples, an incorrect solution may be one or more solutions comprising an incorrect localization parameter representing a location for the first camera that would obstruct the first point-of-view of the first camera. For example, the inaccuracy resolver 122 may label any or all solutions (e.g., in the plurality of suggested solutions) as incorrect if the position and/or orientation of a camera in the solution obstructs the point-of-view of the camera from viewing a planar scene as represented by image data generated by the camera. For instance, an incorrect solution may comprise a position of a camera that would place the camera underground, in or above a ceiling, in or blocked by an object (e.g., wall, pillar, furniture, shelves, etc.), and/or the like as described herein. In some examples, the operation 714 may comprise removing, from the plurality of suggested solutions (e.g., using the inaccuracy resolver 122 or the like), an inconsistent solution. In some examples, an inconsistent solution may be one or more solutions comprising an inconsistent localization parameter representing a location for the first camera that is inconsistent with the second point-of-view of the second camera. For example, the inaccuracy resolver 122 may label any or all solutions (e.g., in the plurality of suggested solutions) as inconsistent if the position and/or orientation of a first camera in the solution causes the first camera's point-of-view (or image plane) of the planar scene to not align (or to disagree) with at least a second camera's point-of-view (or image plane) of the same planar scene as represented by image data generated by each respective camera.

Additionally, or alternatively, the electronic device 600 may utilize the pose-graph pruner 216 to generate a pruned pose-graph construction (e.g., pruned pose-graph construction data 218 or the like), such as shown in FIG. 2. In some examples, the operation 714 may comprise mapping, onto the pose-graph construction (e.g., using the pose-graph pruner 216), a real-line edge representing a real transformation between two nodes. In some examples, a real-line edge (or real transformation) may comprise (or be based on) real-world observation data, such as collected (or measurable) by sensor data (e.g., image sensors, range finders, etc.). For example, a real-line edge may be an edge that was generated based on known data associated with two or more preexisting (or preinstalled) cameras of a preexisting multi-camera system. Additionally, or alternatively, a real-line edge may be an edge that was generated based on known data associated with two or more positions (or points-of-view) captured by one or more mobile cameras (e.g., GPS data collected at two locations associated with a mobile camera during the scan of a planar scene). In some examples, the operation 714 may comprise removing, from the pose-graph construction (e.g., using the pose-graph pruner 216), at least one of a redundant edge or a redundant node. For example, the pose-graph pruner 216 may remove (or delete) any edge that is equivalent to another edge. It should be understood that if two equivalent edges are identified by the pose-graph pruner 216 then one of the two edges may be removed (or deleted) in order to maintain one of the two equivalent edges.

Additionally, or alternatively, the electronic device 600 may utilize the pose estimator 220 to generate (e.g., based on the pruned pose-graph construction data 218 or the like) output data, such as shown in FIG. 2. In some examples, the operation 714 may comprise determining (e.g., using the pose estimator 220 and/or based on the pruned pose-graph construction data 218) a respective pose for the first camera and the second camera from the pruned pose-graph construction. In some examples, the operation 714 may comprise determining, based on the pruned pose-graph construction (e.g., using the pose estimator 220, at least one of a calibration parameter, a localization parameter, a pose, and/or any other camera parameters (described herein) for one or more cameras (e.g., the first camera, the second camera, any or all of the cameras 120A-120N, and/or the like). In some examples, the operation 714 may comprise, at least in part, a solution pipeline.

The process 700 may continue at operation 716, at which the electronic device 600 (or the like as described herein) may generate output data. In some examples, the operation 716 may comprise generating (e.g., based on at least one homography or the like) output data comprising one or more of a known calibration parameter for the second camera, a known localization parameter for the second camera, a pose, an orientation, a position, a solution, and/or any other camera parameters or data as described herein. In some examples, the output data may comprise a solution comprising at least one of a calibration parameter, a localization parameter, and/or the like (as described herein) for one or more cameras (e.g., of a multi-camera system). In some examples, the output data may comprise updated camera data (e.g., updated camera data 128 or the like) for the one or more cameras. In some such examples, the updated camera data may be stored (or recorded) locally (or remotely) to memory 604 (or to a remote storage device, such as a remote server or the like). In some examples, the operation 716 may comprise generating, based on the homography, at least one of a calibration parameter or a localization parameter for an unlocalized and/or uncalibrated camera. In some examples, the operation 716 may comprise, at least in part, a solution pipeline.

Various example systems and processes described herein may include, or be implemented using, or in conjunction with, or for, various planar scenes. In some examples, a planar scene may comprise a location (e.g., captured in video and/or still images by one or more cameras) comprising one or more planar surfaces (e.g., a floor, the ground, a wall, etc.) as described herein.

Various example systems and processes described herein may include, or be implemented using, or in conjunction with, or for, various planar surfaces of sports venues. Example planar surfaces of sports venues may include, without limitation, football fields, soccer fields, hockey rinks, baseball fields, racetracks, tennis courts, basketball courts, pickleball courts, and/or any other planar surface for playing and/or competing in one or more sports as described herein. Example sports venues may include, without limitation, football stadiums, soccer stadiums, hockey arenas, baseball stadiums, basketball arenas racetracks, amphitheaters, and/or any other sporting locations as described herein.

Various example systems and processes described herein may include, or be implemented using, or in conjunction with, or for, various planar surfaces of retail locations. Example planar surfaces of retail locations may include, without limitation, floors, counters (e.g., order counters, pickup counters, self-checkout counters, bagging area counters, etc.), tables, booths, shelves, doors, walls, checkout conveyor belts, and/or any other planar surface of a retail space as described herein. Example retail locations may include, without limitation, malls, retail stores (e.g., clothing boutiques, department stores, big-box stores, cashierless stores, etc.), stock (or inventory) rooms, warehouses, restaurants, hotels, barbershops, nail salons, and/or any other retail locations as described herein.

Various example systems and processes described herein may include, or be implemented using, or in conjunction with, or for, a device or electronic device. A device or electronic device (e.g., electronic device 600 or the like as described herein) may be, for example, any electronic device comprising processor(s), GPU(s), video codecs (e.g., a hardware and/or software encoder and/or decoder), and/or camera(s). Further, a device or electronic device may be one or more of a server (e.g., media server, web server, streaming server, and/or the like), a computing device, a camera (e.g., video camera, etc.), and/or any similar electronic devices equipped with hardware and/or software componentry necessary to perform the various operations described herein.

As set forth above, certain methods, blocks, or operations may be skipped or omitted in some implementations. Blocks or operations may be added to, or removed from, some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A camera localization system comprising:
 a first camera comprising a first point-of-view, wherein the first camera is uncalibrated and unlocalized, wherein the first camera is configured to:
  generate first image data representing a planar scene, wherein the first image data comprises a first image plane representing the first point-of-view;
 at least one of:
  (i) three-dimensional template data comprising second image data representing the planar scene, or
  (ii) a second camera comprising a second point-of-view, wherein the second camera is calibrated and localized, wherein the second camera is configured to:
   generate the second image data representing the planar scene, wherein the second image data comprises a second image plane representing the second point-of-view; and
 a computing device comprising:
  a keypoint matching model configured to:
   identify a keypoint of the planar scene that is visible in the first image data and the second image data;
   match the keypoint of the planar scene to a first pixel of the first image plane;
   match the keypoint of the planar scene to a second pixel of the second image plane; and
   generate homographies comprising homographic transformations between the planar scene, the first image plane, and the second image plane based on the keypoint, the first pixel, and the second pixel; and
  a solution pipeline configured to:
   generate, based on at least one of the homographies, output data comprising a solution comprising at least one of a calibration parameter or a localization parameter for the first camera.

2. The camera localization system of claim 1, wherein the solution pipeline comprises:
a minimal solver model configured to:
receive a first image from the first image data;
receive at least three images from the second image data;
receive, at least in part, the homographies; and
generate a plurality of suggested solutions comprising at least one of a suggested calibration parameter or a suggested localization parameter for the first camera; and
an inaccuracy resolver model configured to:
generate, based on the plurality of suggested solutions, the output data by:
removing, from the plurality of suggested solutions, an incorrect solution comprising an incorrect localization parameter representing a location for the first camera that would obstruct the first point-of-view of the first camera; and
removing, from the plurality of suggested solutions, an inconsistent solution comprising an inconsistent localization parameter representing a location for the first camera that is inconsistent with the second point-of-view of the second camera.

3. The camera localization system of claim 1, wherein the solution pipeline comprises:
a homography estimation model configured to:
receive, at least in part, the homographies, wherein the homographies represent at least one planar surface of the planar scene; and
generate, based on the homographic transformations, a pose-graph construction comprising a plurality of nodes connected by a plurality of edges, wherein a respective node of the plurality of nodes represents a pose comprising a position and an orientation for a respective camera, wherein a respective edge of the plurality of edges represents a respective homographic transformation between two nodes;
a pose-graph pruning model configured to:
generate a pruned pose-graph construction by:
mapping, onto the pose-graph construction, a real-line edge representing a real transformation between two nodes; and
removing, from the pose-graph construction, at least one of a redundant edge or a redundant node; and
a pose estimation model configured to:
generate, based on the pruned pose-graph construction, the output data by:
determining a respective pose for the first camera and the second camera from the pruned pose-graph construction.

4. A method comprising:
matching a plurality of keypoints of a planar scene to a first pixel of a first image plane and a second pixel of a second image plane;
generating a homography relating the planar scene, the first image plane, and the second image plane based on the plurality of keypoints, the first pixel, and the second pixel; and
generating, based on the homography, at least one of a calibration parameter or a localization parameter for an unlocalized camera.

5. The method of claim 4, comprising:
identifying the plurality of keypoints of the planar scene that is visible in the first image plane and the second image plane.

6. The method of claim 4, comprising:
generating, based on the homography, a plurality of suggested solutions comprising at least one of a suggested calibration parameter or a suggested localization parameter associated with the first image plane;
removing, from the plurality of suggested solutions, an incorrect solution comprising an incorrect localization parameter indicating an obstruction to the first image plane; and
removing, from the plurality of suggested solutions, an inconsistent solution comprising an inconsistent localization parameter indicating an inconsistency between the first image plane and the second image plane.

7. The method of claim 4, comprising:
generating, based on the homography, a pose-graph construction comprising a plurality of nodes connected by a plurality of edges, wherein a respective node of the plurality of nodes represents a pose associated with the first image plane or the second image plane, wherein a respective edge of the plurality of edges represents a respective homographic transformation; and
determining, based on the pose-graph construction, at least one of the calibration parameter or the localization parameter.

8. The method of claim 7, comprising:
generating a pruned pose-graph construction by:
mapping, onto the pose-graph construction, a real-line edge representing a real transformation between two nodes; and
removing, from the pose-graph construction, at least one of a redundant edge or a redundant node; and
determining, based on the pruned pose-graph construction, at least one of the calibration parameter or the localization parameter.

9. The method of claim 4, comprising:
generating, using a first camera, first image data comprising the first image plane representing the planar scene from a first point-of-view, wherein the first camera is the unlocalized camera; and
generating, using a second camera, second image data comprising the second image plane representing the planar scene from a second point-of-view.

10. The method of claim 9, comprising:
generating, using the second camera, scene scan data comprising a plurality of image planes representing the planar scene from a plurality of points-of-view, wherein the scene scan data comprises at least one of a calibration parameter or a localization parameter associated with the plurality of image planes, wherein the second camera comprises a mobile camera.

11. The method of claim 9, comprising:
generating, using the second camera, localized camera data comprising a plurality of image planes representing the planar scene from a plurality of points-of-view, wherein the localized camera data comprises at least one of a calibration parameter or a localization parameter associated with the plurality of image planes, wherein the second camera comprises a plurality of localized cameras.

12. A system comprising:
a keypoint matching model configured to:
match a plurality of keypoints of a planar scene to a first pixel of a first image plane and a second pixel of a second image plane; and
generate a homography relating the planar scene, the first image plane, and the second image plane based on the plurality of keypoints, the first pixel, and the second pixel; and a solution pipeline configured to:
  generate, based on the homography, at least one of a calibration parameter or a localization parameter for an unlocalized camera.

13. The system of claim 12, wherein the keypoint matching model is configured to:
  identify the plurality of keypoints of the planar scene that is visible in the first image plane and the second image plane.

14. The system of claim 12, wherein the solution pipeline comprises:
  a minimal solver model configured to:
    generate, based on the homography, a plurality of suggested solutions comprising at least one of a suggested calibration parameter or a suggested localization parameter associated with the first image plane; and
  an inaccuracy resolver model configured to:
    remove, from the plurality of suggested solutions, an incorrect solution comprising an incorrect localization parameter indicating an obstruction to the first image plane; and
    remove, from the plurality of suggested solutions, an inconsistent solution comprising an inconsistent localization parameter indicating an inconsistency between the first image plane and the second image plane.

15. The system of claim 12, wherein the solution pipeline comprises:
  a homography estimation model configured to:
    generate, based on the homography, a pose-graph construction comprising a plurality of nodes connected by a plurality of edges, wherein a respective node of the plurality of nodes represents a pose associated with the first image plane or the second image plane, wherein a respective edge of the plurality of edges represents a respective homographic transformation.

16. The system of claim 15, wherein the solution pipeline comprises:
  a pose-graph pruning model configured to:
    generate a pruned pose-graph construction by:
      mapping, onto the pose-graph construction, a real-line edge representing a real transformation between two nodes; and
      removing, from the pose-graph construction, at least one of a redundant edge or a redundant node; and
  a pose estimation model configured to:
    determine, based on the pruned pose-graph construction, at least one of the calibration parameter or the localization parameter.

17. The system of claim 12, comprising:
  a first camera, wherein the first camera is the unlocalized camera, wherein the first camera is configured to:
    generate the first image plane representing the planar scene from a first point-of-view; and
  a second camera, wherein the second camera is configured to:
    generate the second image plane representing the planar scene from a second point-of-view.

18. The system of claim 17, wherein the keypoint matching model is configured to:
  receive, from the first camera, first image data comprising the first image plane representing the planar scene from the first point-of-view; and
  receive, from the second camera, second image data comprising the second image plane representing the planar scene from the second point-of-view.

19. The system of claim 17, wherein the second camera comprises:
  a mobile camera configured to:
    generate scene scan data comprising a plurality of image planes representing the planar scene from a plurality of points-of-view, wherein the scene scan data comprises at least one of a calibration parameter or a localization parameter associated with the plurality of image planes.

20. The system of claim 17, wherein the second camera comprises:
  a plurality of localized cameras configured to:
    generate localized camera data comprising a plurality of image planes representing the planar scene from a plurality of points-of-view, wherein the localized camera data comprises at least one of a calibration parameter or a localization parameter associated with the plurality of image planes.

* * * * *